United States Patent
Shibata et al.

(10) Patent No.: US 11,651,684 B2
(45) Date of Patent: May 16, 2023

(54) VEHICLE LIGHTING SYSTEM, VEHICLE, INTER-VEHICLE COMMUNICATION SYSTEM AND VEHICLE SYSTEM

(71) Applicant: KOITO MANUFACTURING CO., LTD., Tokyo (JP)

(72) Inventors: Yoshinori Shibata, Shizuoka (JP); Naoki Takii, Shizuoka (JP); Misako Kamiya, Shizuoka (JP); Norihisa Sutou, Shizuoka (JP); Masao Okawa, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 314 days.

(21) Appl. No.: 16/958,423

(22) PCT Filed: Dec. 18, 2018

(86) PCT No.: PCT/JP2018/046561
§ 371 (c)(1),
(2) Date: Jun. 26, 2020

(87) PCT Pub. No.: WO2019/131329
PCT Pub. Date: Jul. 4, 2019

(65) Prior Publication Data
US 2020/0349836 A1 Nov. 5, 2020

(30) Foreign Application Priority Data

Dec. 28, 2017 (JP) .............................. JP2017-254313
Dec. 28, 2017 (JP) .............................. JP2017-254315
Jan. 12, 2018 (JP) .............................. JP2018-003693

(51) Int. Cl.
*B60Q 1/50* (2006.01)
*G08G 1/0965* (2006.01)

(52) U.S. Cl.
CPC ........... *G08G 1/0965* (2013.01); *B60Q 1/503* (2013.01)

(58) Field of Classification Search
CPC .......... B60Q 1/50; B60Q 1/503; B60Q 5/005; G08G 1/0965
See application file for complete search history.

(56) References Cited

U.S. PATENT DOCUMENTS 10,134,280 B1 * 11/2018 You ....................... B60Q 1/525
2011/0068910 A1    3/2011 Iwai et al.
(Continued)

FOREIGN PATENT DOCUMENTS

CN     102089186 A    6/2011
JP     H09-277887 A   10/1997
(Continued)

OTHER PUBLICATIONS

International Search Report issued in International Application No. PCT/JP2018/046561, dated Mar. 12, 2019 (1 page).
(Continued)

*Primary Examiner* — Zheng Song
(74) *Attorney, Agent, or Firm* — Osha Bergman Watanabe & Burton LLP

(57) ABSTRACT

A vehicle lighting system provided in a vehicle includes: a lighting unit configured to emit light toward outside of a vehicle; and a lighting control unit configured to control the lighting unit such that the lighting unit visually presents, to an oncoming vehicle present ahead of the vehicle, predetermined information on traveling support of the oncoming vehicle, based on a vehicle width of the oncoming vehicle and a road width in a lateral region of the vehicle.

18 Claims, 25 Drawing Sheets

(56) References Cited

U.S. PATENT DOCUMENTS

| | | | |
|---|---|---|---|
| 2013/0335212 A1* | 12/2013 | Purks | B60Q 1/34 |
| | | | 340/465 |
| 2014/0062685 A1* | 3/2014 | Tamatsu | G08G 1/005 |
| | | | 340/425.5 |
| 2017/0255093 A1 | 9/2017 | Fujita et al. | |
| 2018/0118099 A1* | 5/2018 | Kunii | B60Q 1/38 |
| 2018/0260182 A1* | 9/2018 | Suzuki | G02B 27/0101 |
| 2018/0297470 A1* | 10/2018 | Kim | B60Q 1/085 |
| 2018/0342163 A1* | 11/2018 | Nishiwaki | G08G 1/167 |
| 2019/0118705 A1* | 4/2019 | Yu | G05D 1/0212 |
| 2020/0166950 A1* | 5/2020 | Hase | G05D 1/0088 |

FOREIGN PATENT DOCUMENTS

| | | |
|---|---|---|
| JP | 2002-288795 A | 10/2002 |
| JP | 2005161977 A | 6/2005 |
| JP | 2006-254215 A | 9/2006 |
| JP | 2014182631 A | 9/2014 |
| JP | 2017-159698 A | 9/2017 |
| JP | 2017-187846 A | 10/2017 |
| WO | 2017/073634 A1 | 5/2017 |

OTHER PUBLICATIONS

Written Opinion issued in International Application No. PCT/JP2018/046561, dated Mar. 12, 2019 (5 pages).
Office Action issued in Chinese Application No. 201811623334.9; dated Apr. 26, 2022 (25 pages).

* cited by examiner

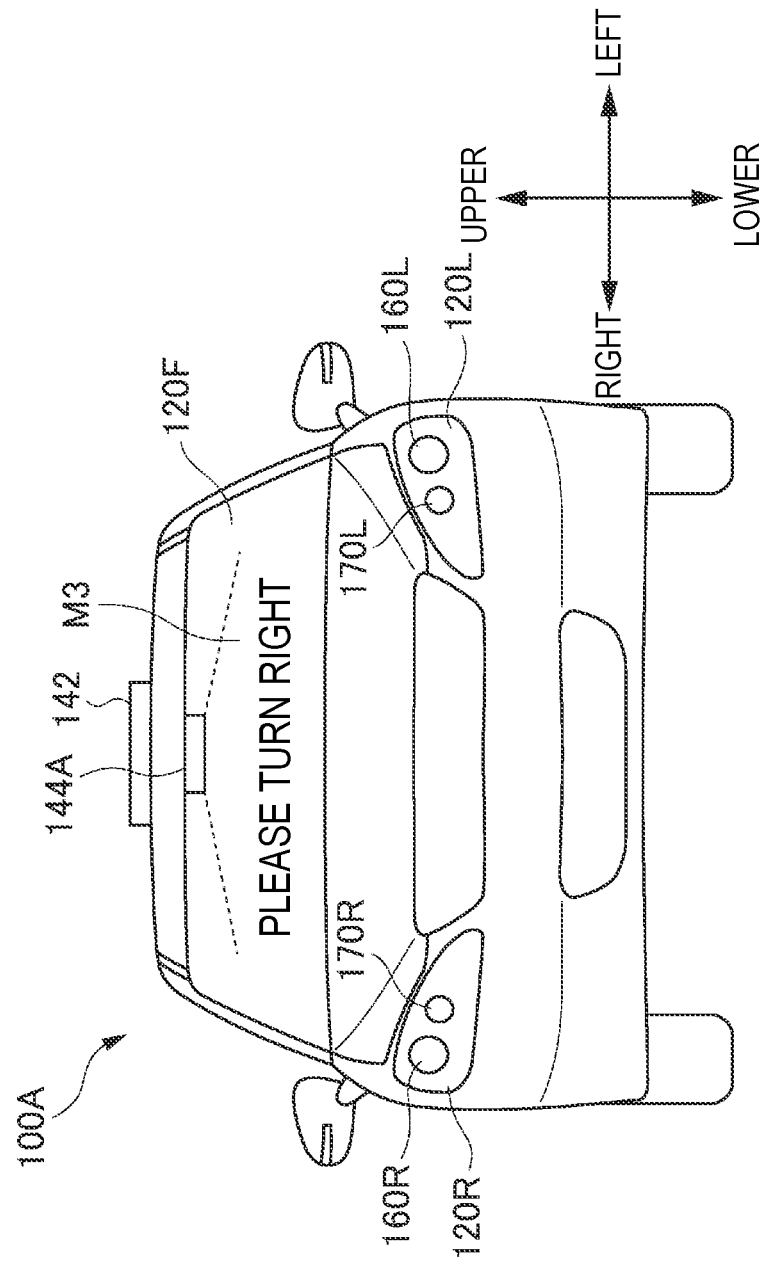

VEHICLE LIGHTING SYSTEM, VEHICLE, INTER-VEHICLE COMMUNICATION SYSTEM AND VEHICLE SYSTEM

TECHNICAL FIELD

The present disclosure relates to a vehicle lighting system, a vehicle and an inter-vehicle communication system.

BACKGROUND ART

Currently, research on an automated driving technology for an automobile is actively carried out in each country, and legislation for allowing a vehicle (Hereinafter, the "vehicle" refers to the automobile.) to travel on a public road in an automated driving mode is being studied in each country. Here, in the automated driving mode, a vehicle system automatically controls traveling of the vehicle. Specifically, in the automated driving mode, the vehicle system automatically performs at least one of steering control (control of a traveling direction of the vehicle), brake control and accelerator control (control of vehicle braking and acceleration/deceleration) based on information (surrounding environment information) indicating a surrounding environment of the vehicle obtained from a sensor such as a camera or a radar (for example, a laser radar or a millimeter wave radar). On the other hand, in a manual driving mode described below, a driver controls the traveling of the vehicle, as is a case with many related-art vehicles. Specifically, in the manual driving mode, the traveling of the vehicle is controlled in accordance with an operation of the driver (a steering operation, a brake operation and an accelerator operation), and the vehicle system does not automatically perform the steering control, the brake control and the accelerator control. A driving mode of the vehicle is not a concept that exists only in some vehicles, but a concept that exists in all vehicles including the related-art vehicles not having an automated driving function, and is classified according to, for example, a vehicle control method.

Therefore, the vehicle traveling in the automated driving mode (hereinafter, appropriately referred to as an "automated driving vehicle") and the vehicle traveling in the manual driving mode (hereinafter, appropriately referred to as a "manual driving vehicle") are expected to coexist on the public road in the future.

As an example of the automated driving technology, Patent Literature 1 discloses an automated following traveling system in which a following vehicle automatically follows a preceding vehicle. In the automated following traveling system, each of the preceding vehicle and the following vehicle includes a lighting system, and character information for preventing other vehicles from interrupting between the preceding vehicle and the following vehicle is displayed on the lighting system of the preceding vehicle, and character information indicating that the following vehicle automatically follows the preceding vehicle is displayed on the lighting system of the following vehicle.

CITATION LIST

Patent Literature

Patent Literature 1: JP-A-H9-277887

SUMMARY OF INVENTION

Technical Problem

Communication between vehicles is expected to be important in order to ensure smooth traveling of the vehicles on the road where the automated driving vehicle and the manual driving vehicle coexist. For example, in a situation where two vehicles facing each other while traveling on a narrow road pass each other, communication between the two vehicles is an important factor in order to ensure smooth traveling of the two vehicles. In this respect, it is conceivable to realize the communication between the two vehicles by using a wireless communication function (an inter-vehicle communication function), but the communication between the two vehicles using the wireless communication function cannot be realized when one of the two vehicles does not have the wireless communication function. In this way, in a coming automated driving society, there is room for further consideration of the communication between the vehicles.

Therefore, a first object of the present disclosure is to provide a vehicle lighting system and a vehicle capable of realizing rich visual communication between vehicles.

Next, in the automated driving society where the automated driving vehicle travels everywhere in a city, visual communication between the vehicle and a pedestrian or the like present outside the vehicle is expected to be more important. Particularly, when a message from the vehicle is visually presented to the pedestrian, the pedestrian can visually recognize an intention or the like of the vehicle, and thus can feel safe. On the other hand, it is assumed that pedestrian does not notice the message from the vehicle, or that the pedestrian cannot determine whether the message from the vehicle is presented to the pedestrian. In this way, there is room for further consideration of the visual communication between the vehicle and an object.

Therefore, a second object of the present disclosure is to provide a vehicle lighting system and a vehicle capable of realizing rich visual communication between a vehicle and an object.

In addition, in the automated driving society where the automated driving vehicle travels everywhere in the city, the communication between the vehicles is expected to be important in order to ensure smooth traveling of the vehicle. Particularly, when a message of one vehicle is visually presented to an occupant of the other vehicle, the occupant of the other vehicle can visually recognize an intention or the like of the other vehicle, and thus can feel safe. On the other hand, it is assumed that the occupant of the other vehicle does not notice the visual message from one vehicle, or that the occupant of the other vehicle cannot determine whether the visual message from one vehicle is presented to the occupant of the other vehicle. In this way, there is room for further consideration of the visual communication between the vehicles.

Therefore, a third object of the present disclosure is to provide a vehicle system, a vehicle and an inter-vehicle communication system capable of realizing rich communication between vehicles through visual and auditory sense.

Solution to Problem

A vehicle lighting system according to an aspect of the present disclosure is provided in a vehicle capable of traveling in an automated driving mode, and includes:

a lighting unit configured to emit light toward outside of a vehicle; and a lighting control unit configured to control the lighting unit such that the lighting unit visually presents, to an oncoming vehicle present ahead of the vehicle, predetermined information on traveling support of the oncoming vehicle, based on a vehicle width of the oncoming vehicle and a road width in a lateral region of the vehicle.

According to the above configuration, the predetermined information on the traveling support of the oncoming vehicle is visually presented to the oncoming vehicle based on the vehicle width of the oncoming vehicle present ahead of the vehicle and the road width in the lateral region of the vehicle. In this way, since an occupant of the oncoming vehicle can visually recognize the predetermined information on the traveling support of the oncoming vehicle, the vehicle lighting system capable of realizing rich visual communication between vehicles can be provided.

The predetermined information may include at least one of character information and graphic information.

According to the above configuration, since the occupant of the oncoming vehicle can visually recognize the predetermined information on the traveling support of the oncoming vehicle as the character information and/or the graphic information, the vehicle lighting system capable of realizing the rich visual communication between the vehicles can be provided.

When at least the vehicle width is equal to or greater than the road width, the lighting control unit may control the lighting unit such that the lighting unit visually present, to the oncoming vehicle, information urging the oncoming vehicle to stop.

According to the above configuration, when at least the vehicle width of the oncoming vehicle is equal to or greater than the road width in the lateral region of the vehicle, the information urging the oncoming vehicle to stop is visually presented to the oncoming vehicle. In this way, the occupant of the oncoming vehicle can visually recognize that the oncoming vehicle should be stopped in order for the two vehicles to pass each other without trouble (such as contact between the two vehicles). Therefore, the vehicle lighting system capable of realizing the rich visual communication between the vehicles can be provided.

The predetermined information may include the character information.

The lighting control unit is configured to
  determine a display language of the predetermined information based on a current position of the vehicle, and
  control the lighting unit such that the lighting unit visually presents the predetermined information to the oncoming vehicle in the determined display language.

According to the above configuration, the display language of the predetermined information is determined based on the current position of the vehicle, and then the predetermined information is visually presented to the oncoming vehicle in the determined display language. In this way, since the display language of the character information constituting the predetermined information is associated with the current position of the vehicle, possibility that the occupant of the oncoming vehicle can understand the predetermined information on the traveling support of the oncoming vehicle can be increased. Therefore, the vehicle lighting system capable of realizing the rich visual communication between the vehicles can be provided.

The predetermined information may include the character information.

The lighting unit may be configured to visually present the predetermined information to the oncoming vehicle in a plurality of display languages.

According to the above configuration, the predetermined information is visually presented to the oncoming vehicle in the plurality of display languages. In this way, the possibility that the occupant of the oncoming vehicle can understand the predetermined information on the traveling support of the oncoming vehicle can be increased. Therefore, the vehicle lighting system capable of realizing the rich visual communication between the vehicles can be provided.

The lighting unit may be configured to visually present the predetermined information on a road surface ahead of the oncoming vehicle.

According to the above configuration, the predetermined information on the traveling support of the oncoming vehicle is visually presented on the road surface ahead of the oncoming vehicle. In this way, since the occupant of the oncoming vehicle can visually recognize the predetermined information by looking at the road surface ahead, the vehicle lighting system capable of realizing the rich visual communication between the vehicles can be provided.

The lighting control unit may be configured to wirelessly transmit the predetermined information to the oncoming vehicle.

According to the above configuration, the predetermined information on the traveling support of the oncoming vehicle is visually presented to the oncoming vehicle and is wirelessly transmitted to the oncoming vehicle. As described above, it is possible to increase the possibility that the occupant of the oncoming vehicle having the wireless communication function can recognize predetermined information, and it is possible to provide a vehicle lighting system capable of realizing rich communication between the vehicles.

A vehicle lighting system according to another aspect of the present disclosure is provided in a vehicle capable of traveling in an automated driving mode, and includes:
  a first lighting unit configured to visually present a message to outside of a vehicle;
  a first lighting control unit configured to control the first lighting unit;
  a second lighting unit configured to emit a light pattern toward an object present outside the vehicle; and
  a second lighting control unit configured to control the second lighting unit.

The second lighting control unit is configured to control the second lighting unit such that the second lighting unit emits the light pattern toward the object when the first lighting unit visually presents the message to the outside of the vehicle.

According to the above configuration, when the first lighting unit visually presents the message to the outside of the vehicle, the second lighting unit emits the light pattern toward the object. Therefore, the object (for example, a pedestrian or other vehicles) present outside the vehicle can notice presence of the message presented by the vehicle by the light pattern emitted from the second lighting unit toward the object, and can recognize that the message is a message presented from the vehicle to the object. In this way, the vehicle lighting system capable of realizing rich visual communication between the vehicle and the object can be provided.

The second lighting unit may be configured to draw the light pattern on a road surface around the object.

The second lighting control unit may be configured to control the second lighting unit such that the second lighting unit draws the light pattern on the road surface around the object when the first lighting unit visually presents the message to the outside of the vehicle.

According to the above configuration, when the first lighting unit visually presents the message to the outside of the vehicle, the second lighting unit draws the light pattern on the road surface around the object. Therefore, the object present outside the vehicle can notice the presence of the message presented by the vehicle by the light pattern, and can recognize that the message is a message presented from the vehicle to the object.

The light pattern may be a light pattern that visually associates the object with the vehicle.

According to the above configuration, when the first lighting unit visually presents the message to the outside of the vehicle, the light pattern that visually associates the object with the vehicle is drawn on the road surface around the object. Therefore, the object present outside the vehicle can intuitively recognize that the message is presented from the vehicle to the object by the light pattern.

The message may be a message related to an action of the vehicle or a message urging the object to perform a predetermined action.

According to the above configuration, the object present outside the vehicle can recognize an intention of the vehicle and can feel safe by looking at the message related to the action of the vehicle (for example, a stop message) or the message urging the object to perform the predetermined action (for example, a message urging passage of a crosswalk).

A vehicle including the vehicle lighting system is provided.

According to the above configuration, the vehicle capable of realizing rich visual communication can be provided.

A vehicle system according to another aspect of the present disclosure is provided in a vehicle capable of traveling in an automated driving mode, and includes:
 a lighting unit configured to visually present a first message to outside of a vehicle;
 a lighting control unit configured to control the lighting unit;
 a light transmission unit configured to emit a first light in a first wavelength band associated with a predetermined auditory message toward a light reception unit mounted on another vehicle present outside the vehicle; and
 a light transmission control unit configured to control the light transmission unit.

The light transmission control unit is configured to control the light transmission unit such that the light transmission unit emits the first light toward the light reception unit when the lighting unit visually presents the first message to the outside of the vehicle.

According to the above configuration, when the lighting unit visually presents the first message to the outside of the vehicle, the first light is emitted toward the light reception unit mounted on another vehicle. When the light reception unit receives the first light, the predetermined auditory message associated with the first wavelength band of the first light is output to inside of another vehicle. Therefore, an occupant of another vehicle can visually recognize the first message from the vehicle, and can aurally recognize the predetermined auditory message from the vehicle. That is, the occupant of another vehicle can visually and aurally recognize an intention of the vehicle. Therefore, the vehicle system capable of realizing rich communication between vehicles through visual and auditory sense can be provided.

The lighting unit may be configured to visually present the first message to the outside of the vehicle by drawing a light pattern on a road surface.

According to the above configuration, the occupant of another vehicle can visually recognize the first message from the vehicle by looking at the light pattern drawn on the road surface.

The lighting unit may be configured to display the first message on a windshield of the vehicle.

According to the above configuration, the occupant of another vehicle can visually recognize the first message displayed on the windshield.

The lighting unit may be configured to visually present the first message to the outside of the vehicle by changing a lighting feature of the lighting unit.

According to the above configuration, the occupant of another vehicle can visually recognize the first message from the vehicle by looking at a change in the lighting feature of the lighting unit.

The light transmission control unit may be configured to
 determine the first light from a plurality of different lights in different wavelength bands based on the first message, and
 control the light transmission unit such that the first light is emitted toward the light reception unit.

According to the above configuration, the first light is determined from the plurality of different lights in different wavelength bands based on the first message, and then the first light is emitted toward the light reception unit mounted on another vehicle. When the light reception unit receives the first light, the predetermined auditory message associated with the first wavelength band of the first light is output to inside of another vehicle. Thus, the occupant of another vehicle can visually recognize the first message and can aurally recognize the predetermined auditory message associated with the first message (or corresponding to the first message).

A vehicle including the vehicle system is provided.

According to the above configuration, the vehicle capable of realizing rich communication between vehicles through visual and auditory sense can be provided.

An inter-vehicle communication system according to an aspect of the present disclosure includes:
 a first vehicle; and
 a second vehicle.

The first vehicle includes:
 a lighting unit configured to visually present a first message toward outside of the first vehicle;
 a lighting control unit configured to control the lighting unit;
 a light transmission unit configured to emit a first light in a first wavelength band toward the second vehicle; and
 a light transmission control unit configured to control the light transmission unit.

The second vehicle includes:
 a light reception unit configured to receive the first light;
 a light reception control unit configured to specify a predetermined auditory message associated with the first wavelength band from among a plurality of auditory messages; and
 an in-vehicle speaker configured to output the specified predetermined auditory message to an occupant of the second vehicle.

The light transmission control unit is configured to control the light transmission unit such that the light transmission unit emits the first light toward the light reception unit when the lighting unit visually presents the first message to the outside of the first vehicle.

According to the above configuration, when the lighting unit visually presents the first message to the outside of the vehicle, the first light is emitted toward the light reception unit mounted on the second vehicle. When the light reception unit receives the first light, the predetermined auditory message associated with the first wavelength band of the first light is output from the in-vehicle speaker toward an occupant of the second vehicle. Therefore, the occupant of the second vehicle can visually recognize the first message from the first vehicle, and can aurally recognize the predetermined auditory message from the first vehicle. That is, the occupant of the second vehicle can visually and aurally recognize an intention of the first vehicle. Therefore, the inter-vehicle communication system capable of realizing rich communication between vehicles through visual and auditory sense can be provided.

BRIEF DESCRIPTION OF DRAWINGS

FIG. 18 is a view showing an example of a message visually presented from the first lighting unit to the other vehicle according to the modification of the second embodiment.

DESCRIPTION OF EMBODIMENTS

First Embodiment

Figure 1:
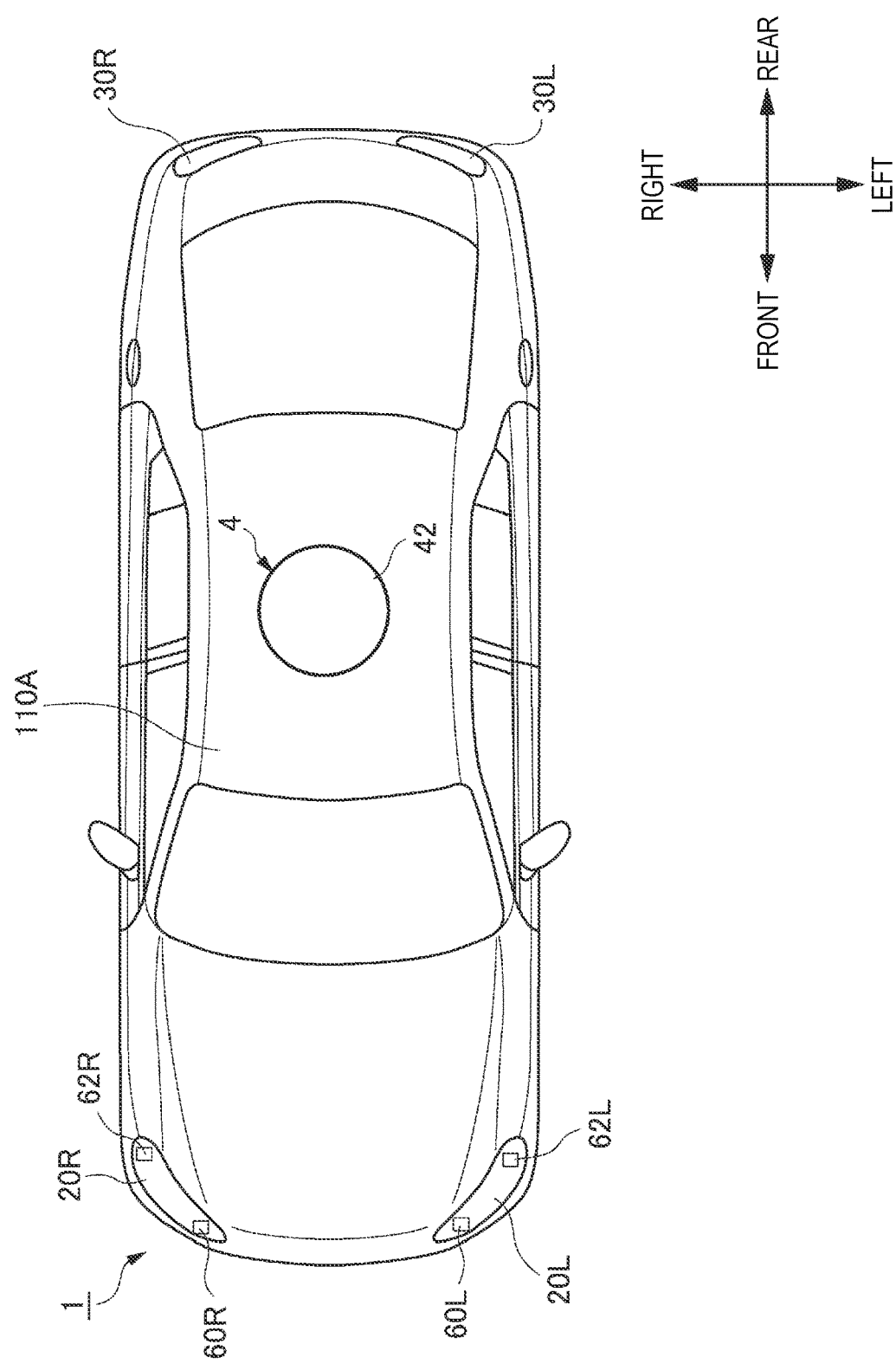
FIG. 1 is a plan view of a vehicle equipped with a vehicle lighting system according to a first embodiment of the present invention.

Hereinafter, a first embodiment of the present invention will be described with reference to the drawings. Description of members having the same reference numerals as those already described in the description of the present embodiment will be omitted for convenience of description. Dimensions of members shown in the drawings may be different from those of actual members for convenience of description.

In the description of the embodiment, a "left-right direction", a "front-rear direction" and an "upper-lower direction" will be appropriately referred to for convenience of description. These directions are relative directions set for a vehicle 1 shown in FIG. 1. Here, the "front-rear direction" is a direction including a "front direction" and a "rear direction". The "left-right direction" is a direction including a "left direction" and a "right direction". The "upper-lower direction" is a direction including an "upper direction" and a "lower direction". Although not shown in FIG. 1, the upper-lower direction is the direction orthogonal to the left-right direction and the front-rear direction.

Figure 2:
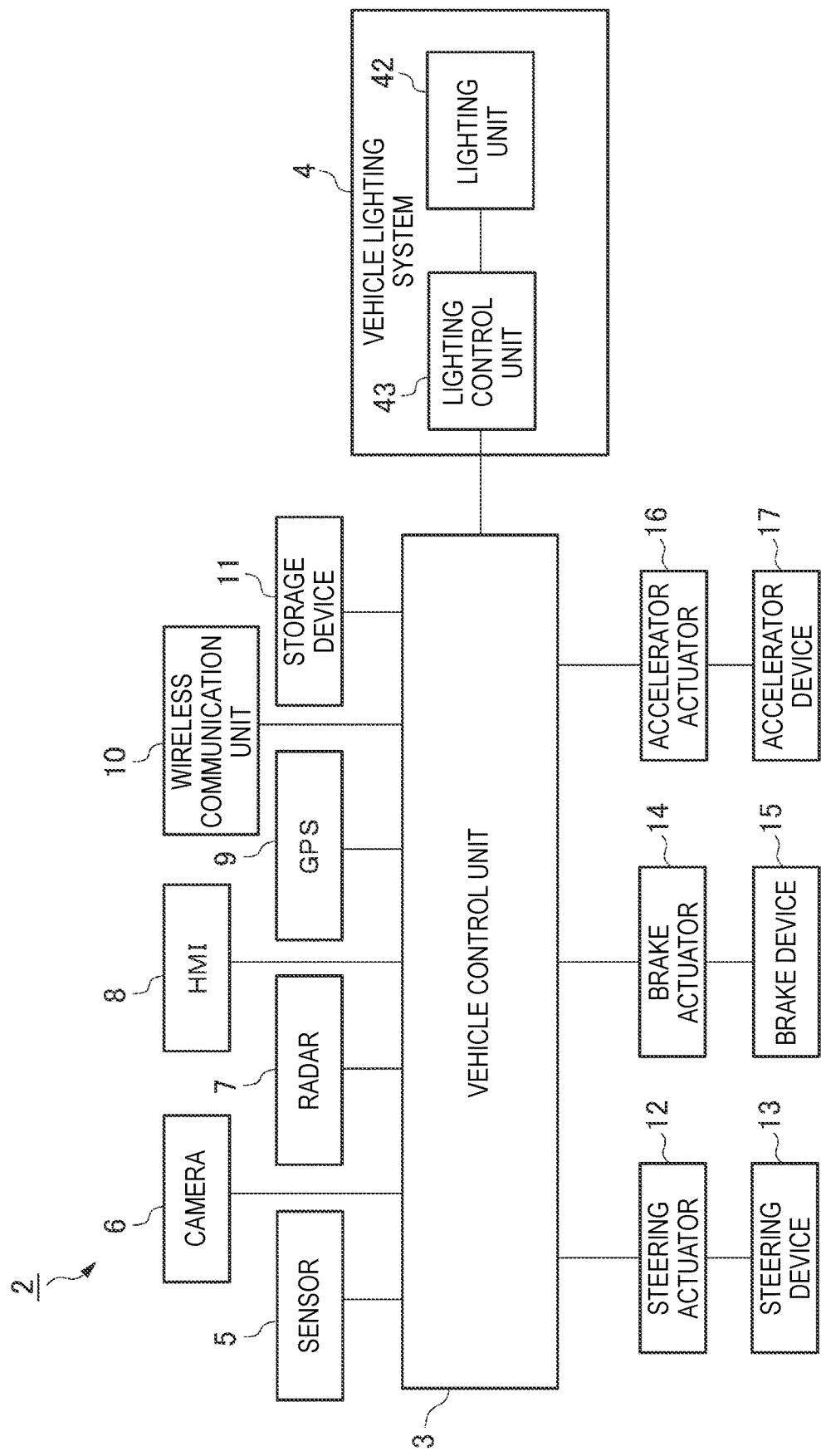
FIG. 2 is a block diagram of a vehicle system including the vehicle lighting system according to the first embodiment.

First, a vehicle lighting system 4 (hereinafter, simply referred to as "lighting system 4") according to the present embodiment will be described below with reference to FIGS. 1 and 2. FIG. 1 is a plan view of a vehicle 1 equipped with the lighting system 4. The vehicle 1 is a vehicle (an automobile) capable of traveling in an automated driving mode, and includes the lighting system 4. The lighting system 4 includes a lighting unit 42 and a lighting control unit 43 (see FIG. 2). The lighting unit 42 is disposed on a vehicle body roof 110A of the vehicle 1, for example, and is configured to emit a light pattern (particularly, a light pattern formed on a road surface by laser light) toward outside of the vehicle 1.

The lighting unit 42 includes, for example, a laser light source configured to emit laser light, a light deflection device configured to deflect the laser light emitted from the laser light source, and an optical system such as a lens. The laser light source is, for example, an RGB laser light source configured to emit red laser light, green laser light and blue laser light. The light deflection device is, for example, a micro electro mechanical systems (MEMS) mirror, a galvanometer mirror, a polygon mirror or the like. As will be described below, the lighting unit 42 visually presents the light pattern (for example, a light pattern M1 indicating character information shown in FIG. 5 or a light pattern M2 indicating graphic information shown in FIG. 6) to other vehicles (particularly, an oncoming vehicle) by scanning with the laser light. Particularly, the lighting unit 42 visually presents the light pattern on the road surface ahead of the oncoming vehicle by scanning with the laser light. When the laser light source is the RGB laser light source, the lighting system 4 can draw the light pattern of various colors on a road.

Although a single lighting unit 42 is disposed on the vehicle body roof 110A in the present embodiment, the number, arrangement, shape and the like of the lighting unit 42 are not particularly limited as long as the lighting unit 42 can emit the light pattern toward an object. For example, when two lighting units 42 are provided, one of the two lighting units 42 may be mounted in a left headlamp 20L, and the other may be mounted in a right headlamp 20R. When four lighting units 42 are provided, one lighting unit 42 may be mounted in each of the left headlamp 20L, the right headlamp 20R, a left rear combination lamp 30L and a right rear combination lamp 30R. A drawing method of the lighting unit 42 may be a digital light processing (DLP) method or a liquid crystal on silicon (LCOS) method. In this case, an LED is used as a light source instead of laser.

Next, a vehicle system 2 of the vehicle 1 will be described with reference to FIG. 2. FIG. 2 shows a block diagram of the vehicle system 2. As shown in FIG. 2, the vehicle system 2 includes a vehicle control unit 3, the lighting system 4, a sensor 5, a camera 6, a radar 7, a human machine interface (HMI) 8, a global positioning system (GPS) 9, a wireless communication unit 10 and a storage device 11. The vehicle system 2 further includes a steering actuator 12, a steering device 13, a brake actuator 14, a brake device 15, an accelerator actuator 16 and an accelerator device 17.

The vehicle control unit 3 is configured to control traveling of the vehicle 1. The vehicle control unit 3 is formed of, for example, at least one electronic control unit (ECU). The electronic control unit includes a computer system (for example, a system on a chip (SoC)) including one or more processors and one or more memories, and an electronic circuit including an active element such as a transistor and a passive element. The processor is, for example, a central processing unit (CPU), a micro processing unit (MPU), a graphics processing unit (GPU) and/or a tensor processing unit (TPU). The CPU may include a plurality of CPU cores. The GPU may include a plurality of GPU cores. The memory includes a read only memory (ROM) and a random access memory (RAM). The ROM may store a vehicle control program. For example, the vehicle control program may include an artificial intelligence (AI) program for automated driving. The AI program is a program constructed by supervised or unsupervised machine learning (particularly, deep learning) using a multilayer neural network. The RAM may temporarily store a vehicle control program, vehicle control data and/or surrounding environment information indicating surrounding environment of the vehicle. The processor may be configured to load a program designated from various vehicle control programs stored in the ROM onto the RAM and to execute various types of processing in cooperation with the RAM. The computer system may include a non-Neumann type computer such as an application specific integrated circuit (ASIC) or a field-programmable gate array (FPGA). Further, the computer system may include a combination of a Neumann type computer and a non-Neumann type computer.

The lighting system 4 is configured to emit the laser light (the light pattern) toward the outside of the vehicle 1 (for example, other vehicles), and includes the lighting unit 42 and the lighting control unit 43. The lighting control unit 43 is configured to control driving of the lighting unit 42, and is formed of an electronic control unit (ECU). The electronic control unit includes a computer system (for example, an SoC) including one or more processors and one or more memories, a laser light source control circuit (an analog processing circuit) configured to control driving of the laser light source of the lighting unit 42, and an light deflection device control circuit (an analog processing circuit) configured to control driving of the light deflection device of the lighting unit 42. The processor is, for example, a CPU, an MPU, a GPU and/or a TPU. The memory includes a ROM and a RAM. The computer system may include a non-Neumann type computer such as an ASIC or an FPGA. In the present embodiment, the vehicle control unit 3 and the lighting control unit 43 are provided as separate components, but the vehicle control unit 3 and the lighting control unit 43 may be integrally configured. In this respect, the lighting control unit 43 and the vehicle control unit 3 may be formed of a single electronic control unit.

For example, the computer system of the lighting control unit 43 specifies the light pattern to be emitted to the outside of the vehicle 1 based on an instruction signal transmitted from the vehicle control unit 3, and then transmits a signal indicating the specified light pattern to the laser light source control circuit and the light deflection device control circuit. The laser light source control circuit generates a control signal for controlling the driving of the laser light source based on the signal indicating the light pattern, and then transmits the generated control signal to the laser light source of the lighting unit 42. On the other hand, the light deflection device control circuit generates a control signal for controlling the driving of the light deflection device based on the signal indicating the light pattern, and transmits the generated control signal to the light deflection device of the lighting unit 42. In this way, the lighting control unit 43 can control the driving of the lighting unit 42.

The sensor 5 includes an acceleration sensor, a speed sensor, a gyro sensor and the like. The sensor 5 is configured to detect a traveling state of the vehicle 1 and output traveling state information to the vehicle control unit 3. The sensor 5 may further include a seating sensor that detects whether a driver is seated in a driver seat, a face direction sensor that detects a direction of a face of the driver, an external weather sensor that detects an external weather condition, a human sensor that detects whether there is a person in the vehicle, or the like.

The camera 6 is, for example, a camera including an image sensor such as a charge-coupled device (CCD) or a complementary MOS (CMOS). The camera 6 may be mounted in the left headlamp 20L and the right headlamp 20R. For example, as shown in FIG. 1, the camera 6 may include a left front camera 60L mounted in the left headlamp 20L and configured to image a front region of the vehicle 1, and a left lateral camera 62L mounted in the left headlamp 20L and configured to image a lateral region of the vehicle 1. The camera 6 may further include a right front camera 60R mounted in the right headlamp 20R and configured to image a front region of the vehicle 1, and a right lateral camera 62R mounted in the right headlamp 20R and configured to image a lateral region of the vehicle 1.

The radar 7 is, for example, a millimeter wave radar, a microwave radar and/or a laser radar (for example, a Lidar). The camera 6 and/or the radar 7 are configured to detect the surrounding environment of the vehicle 1 (other vehicles, pedestrians, road shapes, traffic signs, obstacles and the like)

and output the surrounding environment information indicating the surrounding environment of the vehicle 1 to the vehicle control unit 3.

The HMI 8 includes an input unit that receives an input operation from a driver, and an output unit that outputs traveling information and the like to the driver. The input unit includes a steering wheel, an accelerator pedal, a brake pedal, a driving mode switching switch that switches a driving mode of the vehicle 1, and the like. The output unit is a display that displays various types of traveling information. The GPS 9 is configured to acquire current position information of the vehicle 1 and output the acquired current position information to the vehicle control unit 3.

The wireless communication unit 10 is configured to receive information on other vehicles around the vehicle 1 (for example, traveling information) from other vehicles and to transmit information (for example, traveling information) on the vehicle 1 to other vehicles (inter-vehicle communication). The wireless communication unit 10 is configured to receive infrastructure information from infrastructure equipment such as a traffic light or a sign lamp and to transmit the traveling information on the vehicle 1 to the infrastructure equipment (road-vehicle communication). The wireless communication unit 10 is configured to receive information on a pedestrian from a portable electronic device (a smart phone, a tablet, a wearable device or the like) carried by the pedestrian and to transmit the subject vehicle traveling information on the vehicle 1 to the portable electronic device (pedestrian-vehicle communication). The vehicle 1 may directly communicate with other vehicles, the infrastructure equipment or the portable electronic device in an ad hoc mode, or may communicate via an access point. The vehicle 1 may communicate with other vehicles, the infrastructure equipment or the portable electronic device via a communication network such as the Internet (not shown). A wireless communication standard is, for example, Wi-Fi (registered trademark), Bluetooth (registered trademark), ZigBee (registered trademark), IPWA, DSRC (registered trademark) or Li-Fi. The vehicle 1 may communicate with other vehicles, the infrastructure equipment or the portable electronic device using a fifth generation mobile communication system (5G).

The storage device 11 is an external storage device such as a hard disk drive (HDD) or a solid state drive (SSD). The storage device 11 may store 2D or 3D map information and/or a vehicle control program. For example, the 3D map information may include point cloud data. The storage device 11 is configured to output the map information and the vehicle control program to the vehicle control unit 3 in response to a request from the vehicle control unit 3. The map information and the vehicle control program may be updated via the wireless communication unit 10 and a communication network such as the Internet.

When the vehicle 1 travels in the automated driving mode, the vehicle control unit 3 automatically generates at least one of the steering control signal, the accelerator control signal and the brake control signal based on the traveling state information, the surrounding environment information, the current position information, the map information and the like. The steering actuator 12 is configured to receive the steering control signal from the vehicle control unit 3 and to control the steering device 13 based on the received steering control signal. The brake actuator 14 is configured to receive the brake control signal from the vehicle control unit 3 and to control the brake device 15 based on the received brake control signal. The accelerator actuator 16 is configured to receive the accelerator control signal from the vehicle control unit 3 and to control the accelerator device 17 based on the received accelerator control signal. In this way, in the automated driving mode, the traveling of the vehicle 1 is automatically controlled by the vehicle system 2.

On the other hand, when the vehicle 1 travels in a manual driving mode, the vehicle control unit 3 generates the steering control signal, the accelerator control signal and the brake control signal according to a manual operation of the driver on the accelerator pedal, the brake pedal and the steering wheel. In this way, in the manual driving mode, since the steering control signal, the accelerator control signal and the brake control signal are generated by the manual operation of the driver, the traveling of the vehicle 1 is controlled by the driver.

Next, a driving mode of the vehicle 1 will be described. The driving mode includes the automated driving mode and the manual driving mode. The automated driving mode includes a fully automated driving mode, an advanced driving support mode and a driving support mode. In the fully automated driving mode, the vehicle system 2 automatically performs all traveling control including steering control, brake control and accelerator control, and the driver cannot drive the vehicle 1. In the advanced driving support mode, the vehicle system 2 automatically performs all the traveling control including the steering control, the brake control and the accelerator control, and the driver can drive the vehicle 1 but does not drive the vehicle 1. In the driving support mode, the vehicle system 2 automatically performs a part of the traveling control including the steering control, the brake control and the accelerator control, and the driver drives the vehicle 1 under driving support of the vehicle system 2. On the other hand, in the manual driving mode, the vehicle system 2 does not automatically perform the traveling control, and the driver drives the vehicle 1 without the driving support of the vehicle system 2.

The driving mode of the vehicle 1 may be switched by operating the driving mode switching switch. In this case, the vehicle control unit 3 switches the driving mode of the vehicle 1 among four driving modes (the fully automated driving mode, the advanced driving support mode, the driving support mode and the manual driving mode) according to an operation of the driver on the driving mode switching switch. The driving mode of the vehicle 1 may be automatically switched based on information on a travelable section where an automated driving vehicle can travel or a traveling-prohibited section where traveling of the automated driving vehicle is prohibited, or information on the external weather condition. In this case, the vehicle control unit 3 switches the driving mode of the vehicle 1 based on these pieces of information. The driving mode of the vehicle 1 may be automatically switched by using the seating sensor, the face direction sensor or the like. In this case, the vehicle control unit 3 switches the driving mode of the vehicle 1 based on a signal output from the seating sensor or the face direction sensor.

Figure 3:
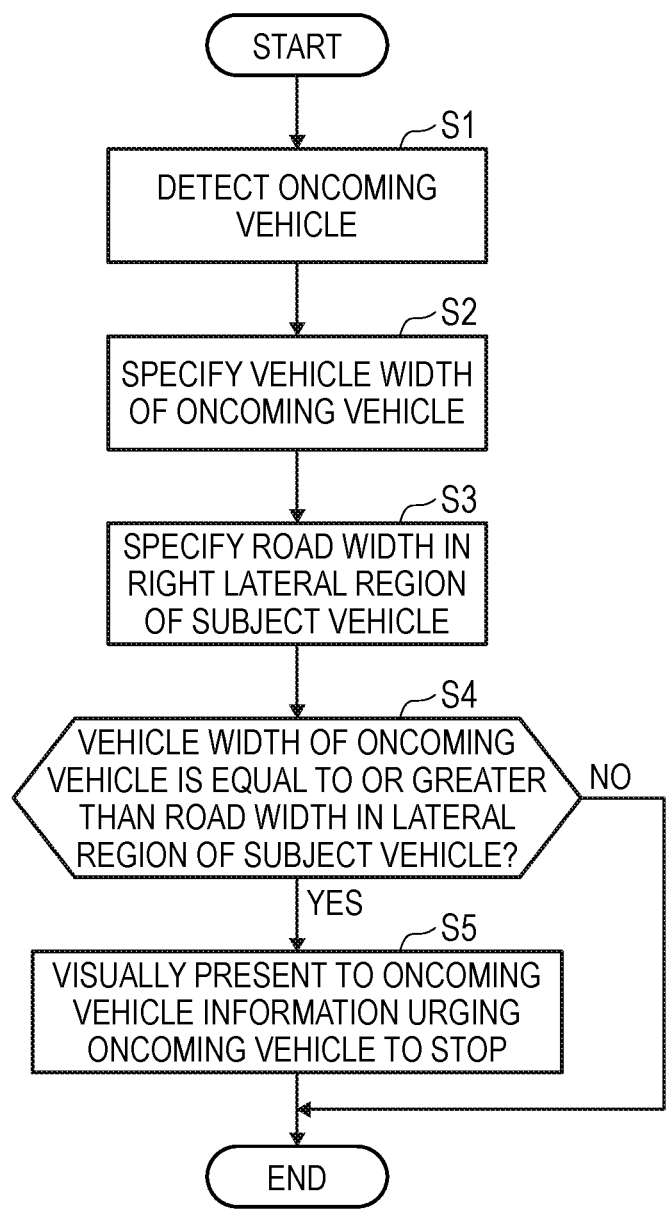
FIG. 3 is a flowchart showing an example of processing for visually presenting, to an oncoming vehicle, information urging the oncoming vehicle to stop.
Figure 4:
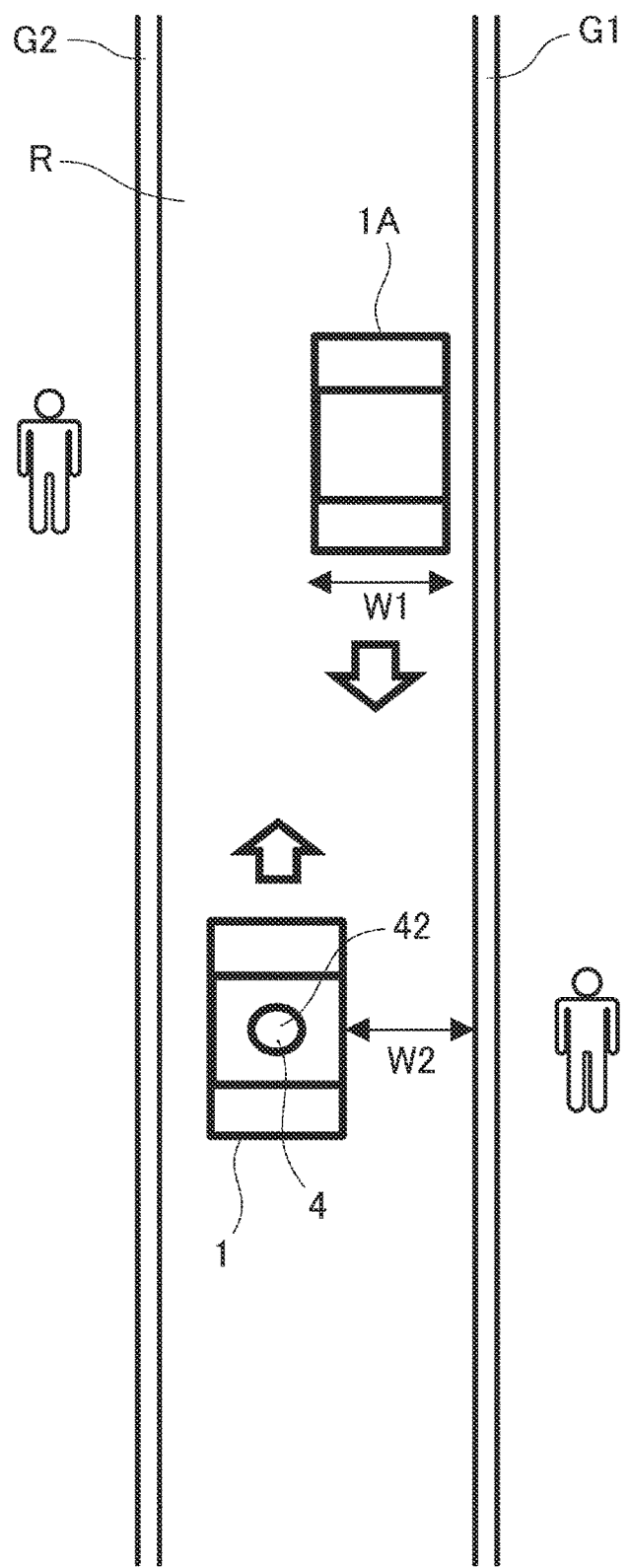
FIG. 4 is a view showing a subject vehicle and the oncoming vehicle traveling on a narrow road.

Next, an example of a control method of the lighting system 4 according to the present embodiment will be described below with reference to FIGS. 3 and 4. FIG. 3 is a flowchart showing an example of processing for visually presenting, to an oncoming vehicle 1A, information urging the oncoming vehicle 1A to stop. FIG. 4 is a view showing the vehicle 1 (the subject vehicle) and the oncoming vehicle 1A traveling on a narrow road R. In the present description, the vehicle 1 is traveling in the automated driving mode. The oncoming vehicle 1A may be a manual driving vehicle or an automated driving vehicle.

As shown in FIG. 3, first, the vehicle control unit 3 of the vehicle 1 detects the oncoming vehicle 1A present in the front region the vehicle 1 based on image data acquired from the camera 6 and/or detection data (for example, point cloud data) acquired from the radar 7 (step S1). Next, in step S2, the vehicle control unit 3 specifies a vehicle width w1 (see FIG. 4) of the oncoming vehicle 1A based on the image data acquired from the camera 6 (particularly, the left front camera 60L and the right front camera 60R) and/or the detection data acquired from the radar 7. Here, the vehicle width w1 of the oncoming vehicle 1A may be defined as a distance from a left end to a right end of the oncoming vehicle 1A. Particularly, when the oncoming vehicle 1A includes side mirrors, the vehicle width w1 of the oncoming vehicle 1A may be defined as a distance from an end portion of the left side mirror of the oncoming vehicle 1A to an end portion of the right side mirror of the oncoming vehicle 1A.

Next, in step S3, the vehicle control unit 3 specifies a road width w2 in a right lateral region of the vehicle 1 (the subject vehicle) based on the image data acquired from the camera 6 (particularly, the right lateral camera 62R on an oncoming vehicle side) and/or the detection data acquired from the radar 7. Here, the road width w2 in the right lateral region may be defined as a distance from a right end of the vehicle 1 (an end portion of the right side mirror when the vehicle 1 includes side mirrors) to a right guardrail G1. When no guardrail is installed on the road R, the road width w2 may be defined as a distance from the right end of the vehicle 1 to an obstacle (for example, a fence of a private house or a utility pole).

Next, in step S4, the vehicle control unit 3 determines whether the vehicle width w1 of the oncoming vehicle 1A is equal to or greater than the road width w2 in the right lateral region of the vehicle 1. When the vehicle control unit 3 determines that the vehicle width w1 is smaller than the road width w2 (NO in step S4), the processing ends. On the other hand, when the vehicle control unit 3 determines that the vehicle width w1 is equal to or greater than the road width w2 (YES in step S4), the processing in step S5 is executed.

Figure 5:
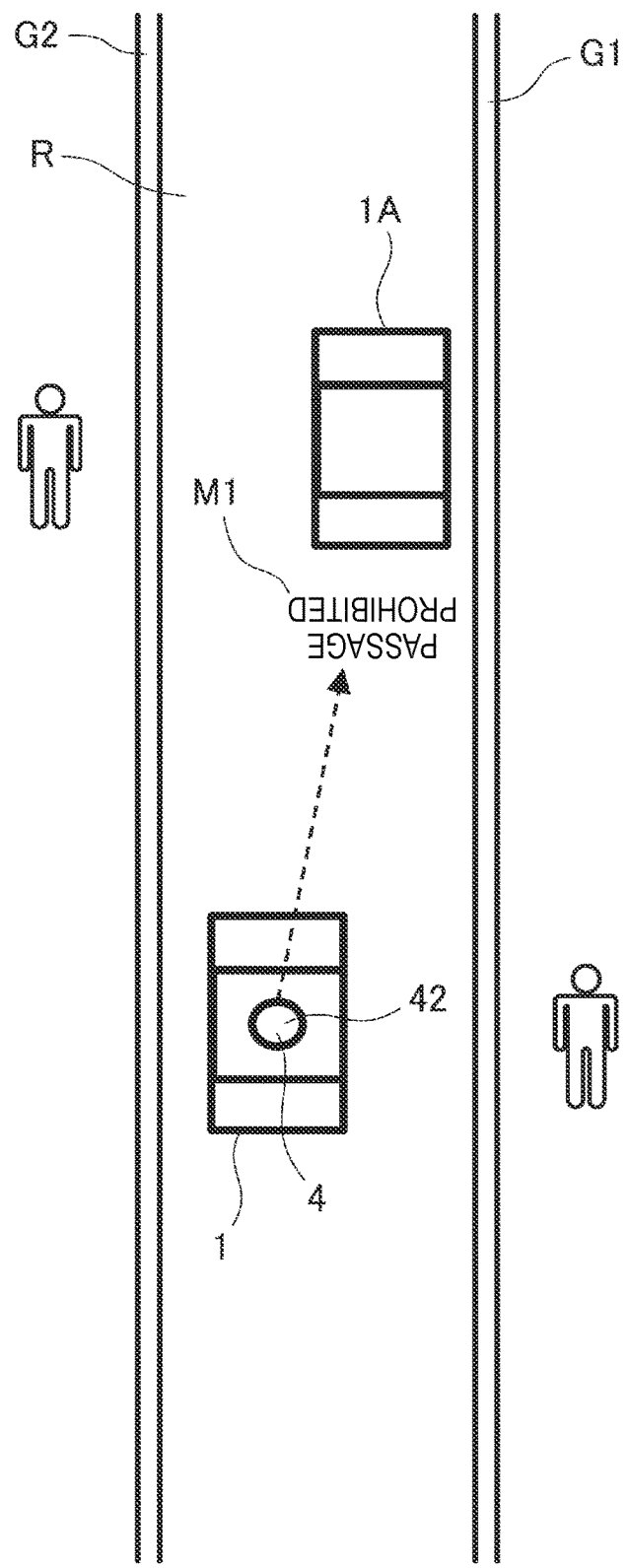
FIG. 5 is a view showing an example of character information for prompting the stop of the oncoming vehicle.
Figure 6:
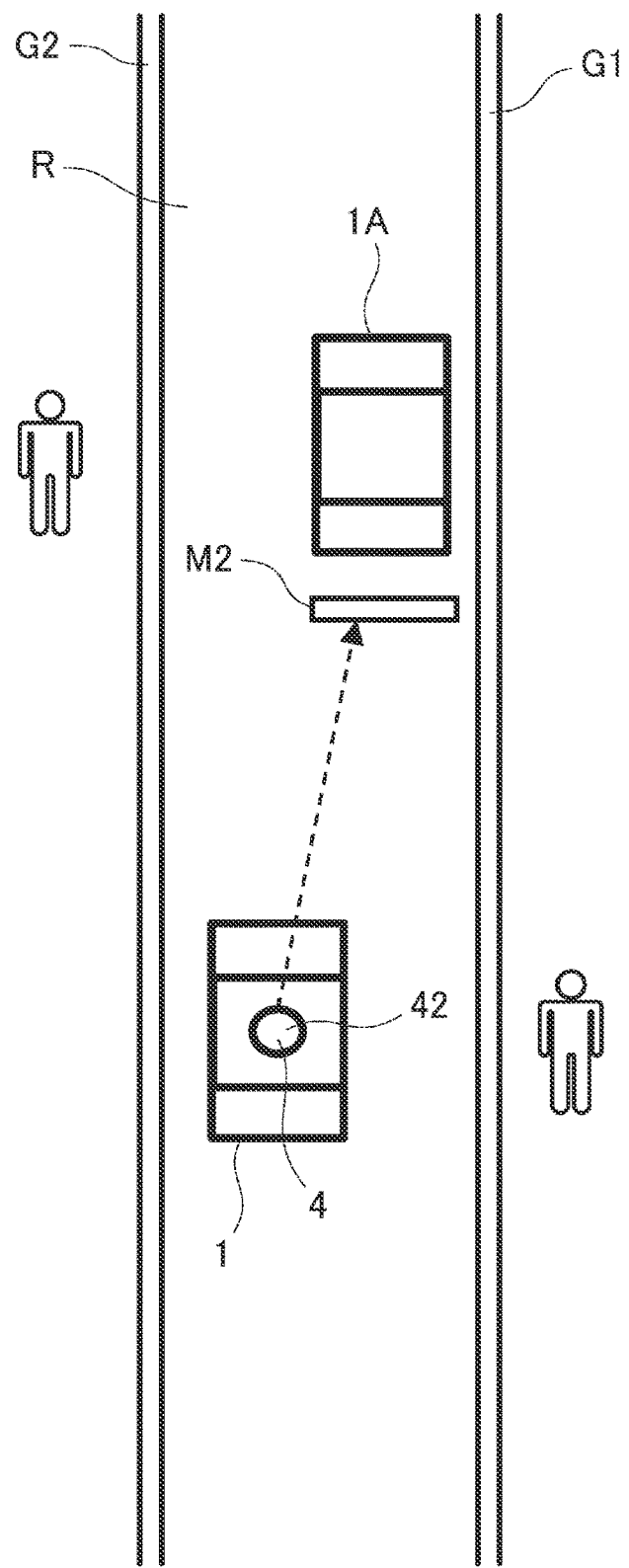
FIG. 6 is a view showing an example of graphic information for prompting the stop of the oncoming vehicle.

Next, in step S5, the lighting unit 42 emits laser light toward the oncoming vehicle 1A to visually present, to the oncoming vehicle 1A, the information (a light pattern) urging the oncoming vehicle 1A to stop. Particularly, the lighting unit 42 draws the information (the light pattern) urging the oncoming vehicle 1A to stop on a road surface ahead of the oncoming vehicle 1A by emitting the laser light onto the road surface ahead of the oncoming vehicle 1A. The information urging the oncoming vehicle 1A to stop may include at least one of the character information and the graphic information. For example, as shown in FIG. 5, the lighting unit 42 may draw the light pattern M1 indicating the character information "Passage prohibited" on the road surface ahead of the oncoming vehicle 1A as the information urging the oncoming vehicle 1A to stop. As shown in FIG. 6, the lighting unit 42 may draw the light pattern M2 indicating a stop line (an example of the graphic information) on the road surface ahead of the oncoming vehicle 1A as the information urging the oncoming vehicle 1A to stop. The graphic information and the character information urging the oncoming vehicle 1A to stop are not limited to examples shown in FIGS. 5 and 6.

Specifically describing the processing in step S5, first, when determining that the vehicle width w1 is equal to or greater than the road width w2, the vehicle control unit 3 generates an instruction signal instructing emission of a predetermined light pattern urging the oncoming vehicle 1A to stop, and then transmits the instruction signal and position information of the oncoming vehicle 1A to the lighting control unit 43. Next, according to the instruction signal received from the vehicle control unit 3, the lighting control unit 43 controls the lighting unit 42 such that the predetermined light pattern urging the oncoming vehicle 1A to stop is drawn on the road surface ahead of the oncoming vehicle 1A. Particularly, the light deflection device of the lighting unit 42 scans the road surface ahead of the oncoming vehicle 1A with the laser light emitted from the laser light source. As a result, the predetermined light pattern is drawn on the road surface ahead of the oncoming vehicle 1A.

According to the present embodiment, based on the vehicle width w1 of the oncoming vehicle 1 present ahead of the vehicle 1 and the road width w2 in the right lateral region of the vehicle 1, the information urging the oncoming vehicle 1A to stop is visually presented on the road surface ahead of the oncoming vehicle 1A as information on traveling support of the oncoming vehicle 1A. In this way, since an occupant of the oncoming vehicle 1A can visually recognize the information urging the oncoming vehicle 1A to stop, the lighting system 4 capable of realizing rich visual communication between vehicles can be provided.

Particularly, according to the present embodiment, when the vehicle width w1 of the oncoming vehicle 1A is equal to or greater than the road width w2, the information urging the oncoming vehicle 1A to stop is visually presented to the oncoming vehicle 1A. In this way, the occupant of the oncoming vehicle 1A can recognize that the oncoming vehicle 1A should be stopped in order for the two vehicles to pass each other without trouble (such as contact between the two vehicles). Therefore, in a situation where it is difficult for the two vehicles to pass each other, the rich visual communication between the vehicles can be realized.

The vehicle 1 may increase the road width w2 such that the vehicle width w1 of the oncoming vehicle 1A is smaller than the road width w2 by visually presenting, to the oncoming vehicle 1A, the information urging the oncoming vehicle 1 A to stop, and then narrowing a distance between a left end of the vehicle 1 and a left guardrail G2. Then, when the vehicle control unit 3 determines that the vehicle width w1 is smaller than the road width w2, the vehicle 1 may pass the oncoming vehicle 1A. On the other hand, when the vehicle control unit 3 determines that it is difficult for the vehicle 1 and the oncoming vehicle 1A to pass each other even if the road width w2 is increased by narrowing the distance between the left end of the vehicle 1 and the left guardrail G2, the vehicle 1 may be moved backward to a predetermined retreat position.

In the description of the present embodiment, the processing in step S4 is executed by the vehicle control unit 3, but the processing in step S4 may be executed by the lighting control unit 43. In this case, the vehicle control unit 3 may transmit information on the vehicle width w1 of the oncoming vehicle 1A and information on the road width w2 to the lighting control unit 43. In the processing in step S4, it is determined whether the vehicle width w1 of the oncoming vehicle 1A is equal to or greater than the road width w2, but the present embodiment is not limited thereto. For example, it may be determined whether a value (w1+α) obtained by adding a predetermined margin a to the vehicle width w1 is equal to or greater than the road width w2. Here, the margin a may be appropriately set according to conditions such as road environment, a vehicle type and/or the automated driving mode.

In the present embodiment, although the lighting system 4 visually presents, to the oncoming vehicle 1A, the information urging the oncoming vehicle 1A to stop, the lighting system 4 may visually present, to the oncoming vehicle 1A, the information on the traveling support of the oncoming vehicle 1A other than the information urging the oncoming vehicle 1A to stop. For example, the lighting system 4 may present, to the oncoming vehicle 1A, information indicating difficulty degree of the vehicle 1 and the oncoming vehicle 1A passing each other. As an example of the information indicating the difficulty degree of the vehicle 1 and the oncoming vehicle 1A passing each other, the graphic information indicating a plurality of stars may be drawn on the road surface. For example, when the difficulty degree of passing each other is the highest, five filled star marks may be drawn on the road surface. In contract, when the difficulty degree of passing each other is the lowest, four white star marks and one filled star mark may be drawn on the road surface. The lighting system 4 may draw numerical information indicating the vehicle width w1 of the oncoming vehicle 1A on the road surface together with the information urging the oncoming vehicle 1A to stop. The lighting system 4 may draw numerical information (w1+α) obtained by adding the predetermined margin α to the vehicle width w1 of the oncoming vehicle 1A on the road surface.

In step S5, the lighting control unit 43 may determine a display language of the character information on the traveling support of the oncoming vehicle 1A (including the character information urging the oncoming vehicle 1A to stop) based on the information on a current position of the vehicle 1 acquired from the GPS 9. Then, the lighting control unit 43 may control the lighting unit 42 such that the character information on the traveling support of the oncoming vehicle 1A is visually presented to the oncoming vehicle 1A in the determined display language. For example, when the vehicle 1 is located in Japan, a light pattern indicating "Passage prohibited" (Japanese) may be drawn on the road surface as the character information urging the oncoming vehicle 1A to stop. When the vehicle 1 is located in an English-speaking area, a light pattern indicating "No traffic" (English) may be drawn on the road surface. When the vehicle 1 is located in a French-speaking area, a light pattern indicating "Pas de trafic" (French) may be drawn on the road surface. In this case, laser drawing data of the light pattern indicating the character information urging the oncoming vehicle to stop for each display language may be stored in the memory of the lighting control unit 43.

In this way, the display language of the character information on the traveling support of the oncoming vehicle 1A is determined based on the current position of the vehicle 1, and then the character information is visually presented to the oncoming vehicle 1A in the determined display language. Therefore, since the display language of the character information is associated with the current position of the vehicle 1, possibility that the occupant of the oncoming vehicle 1A can understand the character information visually presented by the vehicle 1 can be increased, and thus the rich visual communication between the vehicles can be realized.

In step S5, the lighting unit 42 may visually present, to the oncoming vehicle 1A, the character information on the traveling support of the oncoming vehicle 1A in a plurality of display languages. For example, when the vehicle 1 is located in Japan, the lighting unit 42 first draws the light pattern indicating "Passage prohibited" (Japanese) on the road surface as the character information urging the oncoming vehicle 1A to stop. Then, after a predetermined period of time has elapsed, the lighting unit 42 may draw the light pattern indicating "No traffic" (English) on the road surface as the character information urging the oncoming vehicle 1A to stop. The character information indicated by the plurality of display languages may be switched in a predetermined cycle, or the character information indicated by the plurality of display languages may be simultaneously displayed on the road surface.

In this way, since the character information on the traveling support of the oncoming vehicle 1A is visually presented to the oncoming vehicle 1A in the plurality of display languages, the possibility that the occupant of the oncoming vehicle 1A can understand the character information on the traveling support of the oncoming vehicle can be increased. Particularly, in a case of a region where a plurality of languages is used, it is preferable that the character information on the traveling support of the oncoming vehicle 1A is visually presented in the plurality of display languages.

When the oncoming vehicle 1A has a wireless communication function, in step S5, the lighting control unit 43 or the vehicle control unit 3 wirelessly transmits, to the oncoming vehicle 1A, the information on the traveling support of the oncoming vehicle 1A (including the information urging the oncoming vehicle 1A to stop) via the wireless communication unit 10. In this case, the vehicle 1 may transmit the information directly to the oncoming vehicle 1A in the ad hoc mode, or may transmit the information to the oncoming vehicle 1A via the access point. The vehicle 1 may transmit the information to a server present on the communication network via the communication network such as the Internet. In this case, the oncoming vehicle 1A may acquire the above information transmitted from the vehicle 1 by regularly accessing the server. The oncoming vehicle 1A may visually or audibly present the information transmitted from the vehicle 1 to the occupant of the oncoming vehicle 1A. Specifically, a display device installed inside the oncoming vehicle 1A may display the information transmitted from the vehicle 1. The in-vehicle speaker installed inside the oncoming vehicle 1A may output the information transmitted from the vehicle 1 as voice guidance.

In this way, since the information on the traveling support of the oncoming vehicle 1A is visually presented to the oncoming vehicle 1A and the information is wirelessly transmitted to the oncoming vehicle 1A, the possibility that the occupant of the oncoming vehicle 1A having the wireless communication function can recognize the information can be increased. Therefore, the rich communication between the vehicles can be realized.

In the present embodiment, the light pattern is drawn on the road surface ahead of the oncoming vehicle 1A as the information on the traveling support of the oncoming vehicle 1A (including the information urging the oncoming vehicle 1A to stop), but the present embodiment is not limited thereto. For example, the light pattern may be drawn on a part (for example, a windshield) of a vehicle body of the oncoming vehicle 1A. In this case, the windshield of the oncoming vehicle 1A is a windshield for a head-up display (HUD), and may include a light emitting layer formed of two glass plates and a phosphor material provided between the two glass plates. The laser light source of the lighting unit 42 may be configured to emit laser light in a short wavelength band (for example, a wavelength λ=350 nm to 410 nm). When the windshield of the oncoming vehicle 1A is irradiated with the laser light in the short wavelength band, the light emitting layer of the windshield emits light and a predetermined light pattern is formed on the windshield.

Second Embodiment

Next, a second embodiment of the present invention will be described with reference to the drawings. Description of members having the same reference numerals as those already described in the description of the present embodiment will be omitted for convenience of description. Dimensions of members shown in the drawings may be different from those of actual members for convenience of description.

In the description of this embodiment, a "left-right direction", an "upper-lower direction" and a "front-rear direction" will be appropriately referred to for convenience of description. These directions are relative directions set for a vehicle 100 shown in FIG. 7. Here, the "left-right direction" is a direction including a "left direction" and a "right direction". The "upper-lower direction" is a direction including an "upper direction" and a "lower direction". The "front-rear direction" is a direction including a "front direction" and a "rear direction". Although not shown in FIG. 7, the front-rear direction is the direction orthogonal to the left-right direction and the upper-lower direction.

Figure 7:
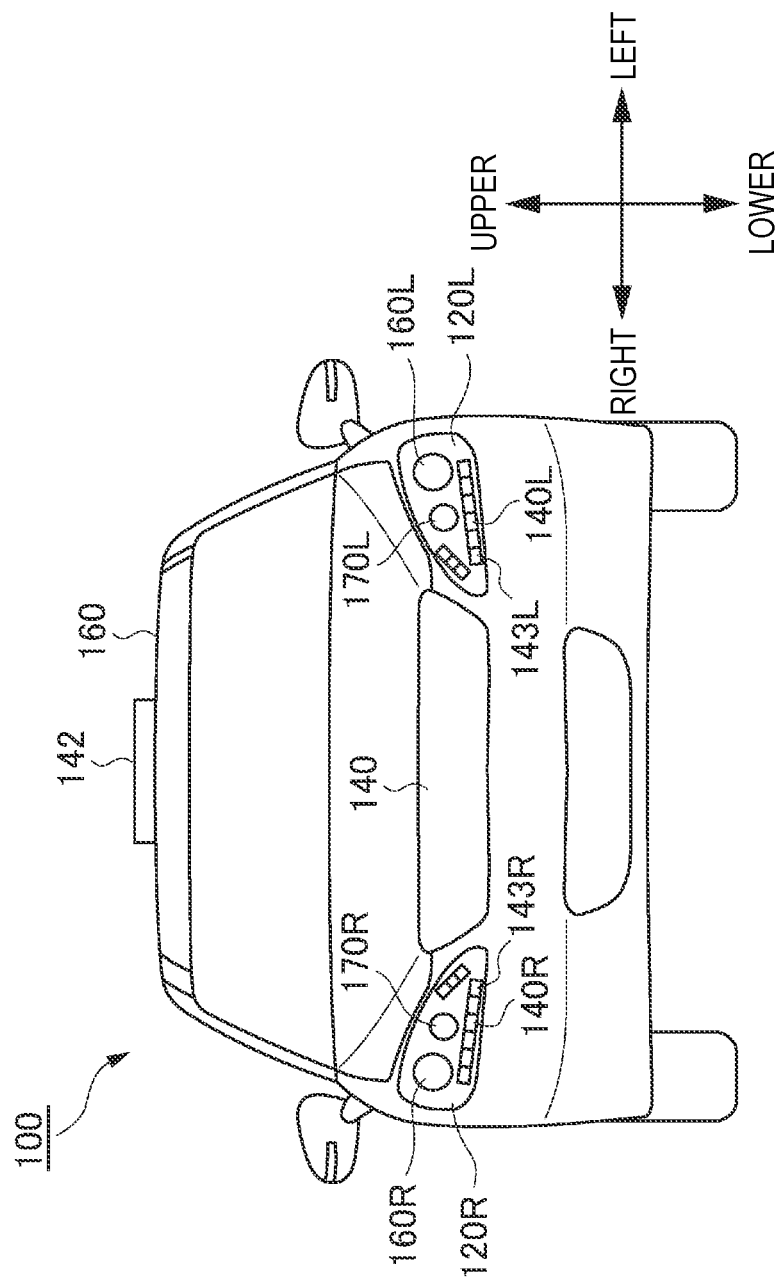
FIG. 7 is a front view of a vehicle equipped with a vehicle lighting system according to a second embodiment of the present invention.
Figure 8:
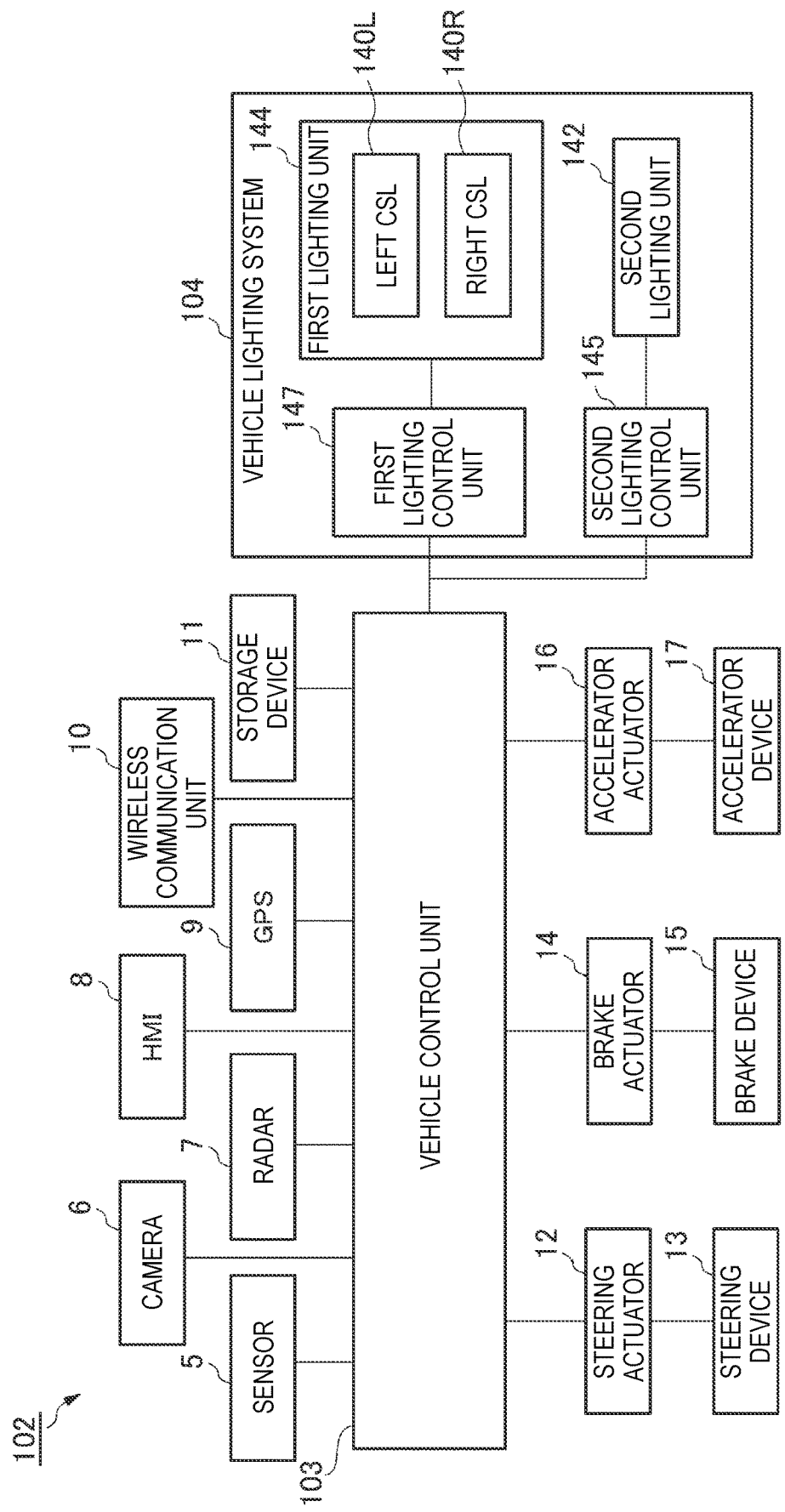
FIG. 8 is a block diagram of a vehicle system including the vehicle lighting system according to the second embodiment.

First, a vehicle lighting system 104 (hereinafter, simply referred to as "lighting system 104") according to the present embodiment will be described below with reference to FIGS. 7 and 8. FIG. 7 is a front view of the vehicle 100 equipped with the lighting system 104. FIG. 8 is a block diagram of a vehicle system 102 including the lighting system 104. The vehicle 100 is a vehicle (an automobile) capable of traveling in an automated driving mode, and includes the vehicle system 102.

As shown in FIGS. 7 and 8, the lighting system 104 includes a first lighting unit 144, a second lighting unit 142, a first lighting control unit 147 and a second lighting control unit 145. The first lighting unit 144 is a lamp that supports visual communication between an object such as the pedestrian or other vehicles and the vehicle 100, and is configured to visually present a message to outside of the vehicle 100. The first lighting unit 144 includes a left communication support lamp 140L (hereinafter, simply referred to as a "left CSL 140L") and a right communication support lamp 140R (hereinafter, simply referred to as a "right CSL 140R").

Figure 9:
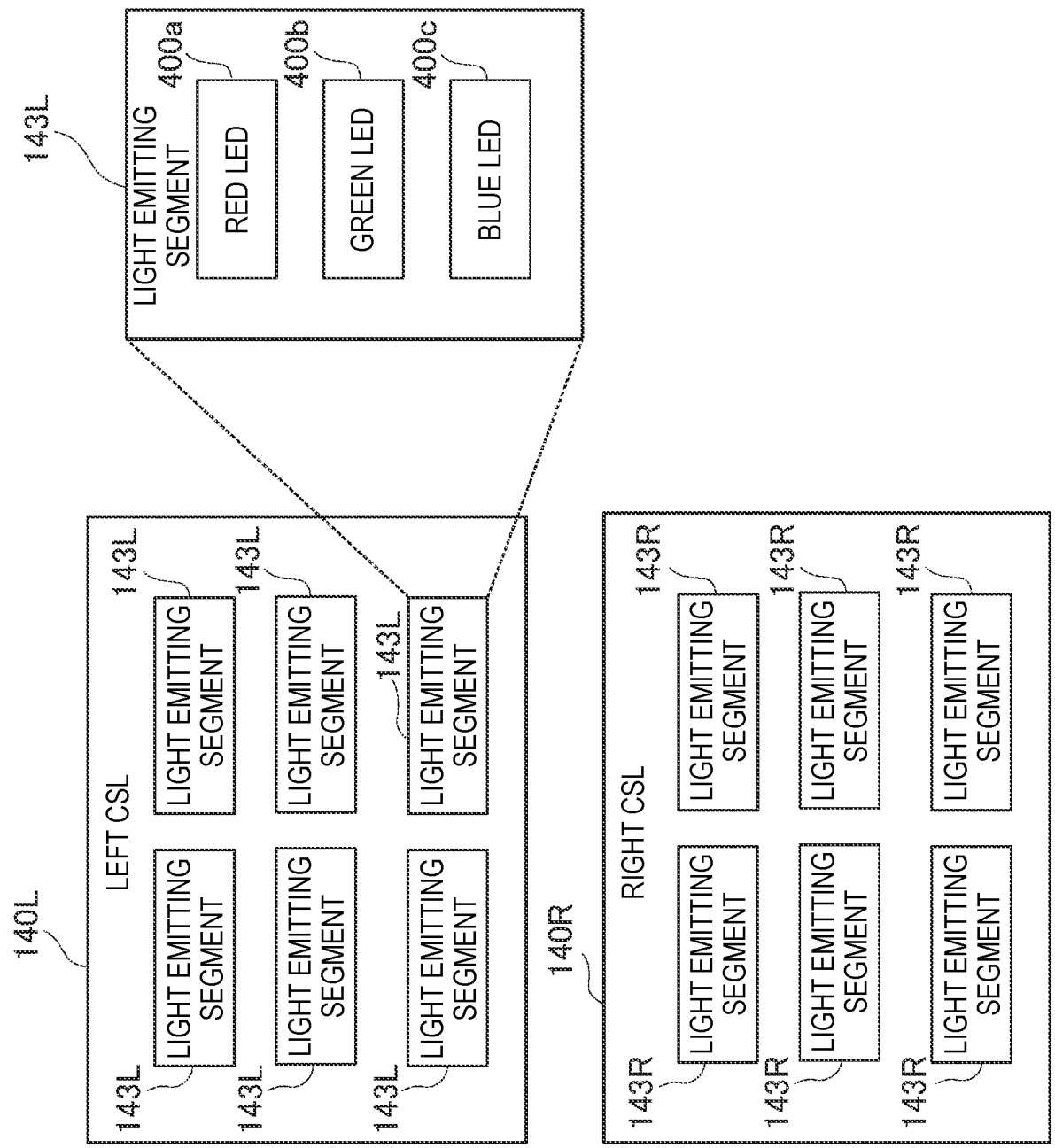
FIG. 9 is a block diagram showing a left communication support lamp and a right communication support lamp.

The left CSL 140L is configured to emit light toward the outside of the vehicle 100, and is disposed in a lamp chamber of a left headlamp 120L mounted on a left front side of the vehicle 100 so as to be visible from ahead of the vehicle 100. The lamp chamber of the left headlamp 120L is formed by a lamp housing (not shown) and a translucent cover (not shown) connected to the lamp housing. The left CSL 140L is disposed so as to extend in the left-right direction of the vehicle 100, and includes six light emitting segments 143L. The six light emitting segments 143L are arranged side by side in the left-right direction of the vehicle 100. Particularly, as shown in FIG. 9, each light emitting segment 143L includes a red LED 400a configured to emit red light, a green LED 400b configured to emit green light and a blue LED 400c configured to emit blue light. Hereinafter, the red LED 400a, the green LED 400b and the blue LED 400c may be collectively referred to simply as a LED 400 for convenience of description. The left headlamp 120L includes a low beam lamp 160L configured to emit a low beam toward ahead of the vehicle 100, and a high beam lamp 170L configured to emit a high beam toward ahead of the vehicle 100.

The right CSL 140R is configured to emit light toward the outside of the vehicle 100, and is disposed in a lamp chamber of a right headlamp 120R mounted on a right front side of the vehicle 100 so as to be visible from ahead of the vehicle 100. The lamp chamber of the right headlamp 120R is formed by a lamp housing (not shown) and a translucent cover (not shown) connected to the lamp housing. The right CSL 140R is disposed so as to extend in the left-right direction of the vehicle 100, and includes six light emitting segments 143R. The six light emitting segments 143R are arranged side by side in the left-right direction of the vehicle 100. Each light emitting segment 143R includes a red LED 400a, a green LED 400b and a blue LED 400c (see FIG. 9). The right headlamp 120R includes a low beam lamp 160R configured to emit a low beam toward ahead of the vehicle 100, and a high beam lamp 170R configured to emit a high beam toward ahead of the vehicle 100.

Arrangement positions of the left CSL 140L and the right CSL 140R are not particularly limited as long as they are visible from ahead of the vehicle 100. For example, the left CSL 140L may be disposed in a region outside the left headlamp 120L (for example, in vicinity of the left headlamp 120L), or may be disposed on a grille 140 of the vehicle 100. The right CSL 140R may be disposed in a region outside the right headlamp 120R (for example, in vicinity of the right headlamp 120R), or may be disposed on the grille 140. In the present embodiment, the left CSL 140L includes six light emitting segments 143L, but the number of the light emitting segments 143L is not particularly limited. Similarly, the right CSL 140R includes six light emitting segments 143R, but the number of the light emitting segments 143R is not particularly limited.

The second lighting unit 142 is disposed on a vehicle body roof 160 of the vehicle 100, for example, and is configured to emit a light pattern (particularly, a light pattern formed on a road surface by laser light) toward the outside of the vehicle 100 (particularly, the object present outside the vehicle 100). The second lighting unit 142 includes, for example, a laser light source configured to emit the laser light, a light deflection device configured to deflect the laser light emitted from the laser light source, and an optical system member such as a lens. The laser light source is, for example, an RGB laser light source configured to emit red laser light, green laser light and blue laser light. The light deflection device is, for example, a MEMS mirror, a galvanometer mirror, a polygon mirror or the like. As will be described below, the second lighting unit 142 visually presents the light pattern to the object by scanning with the laser light. Particularly, the second lighting unit 142 draws the light pattern on the road surface around the object by scanning with the laser light. When the laser light source is the RGB laser light source, the second lighting unit 142 can draw the light pattern of various colors on a road.

Although a single second lighting unit 142 is disposed on the vehicle body roof 160 in the present embodiment, the number, arrangement, shape and the like of the second lighting unit 142 are not particularly limited as long as the second lighting unit 142 can emit the light pattern toward the object. For example, when two second lighting units 142 are provided, one of the two second lighting units 142 may be mounted in the left headlamp 120L and the other may be mounted in the right headlamp 120R. When four second lighting units 142 are provided, one second lighting unit 142 may be mounted in each of the left headlamp 120L, the right headlamp 120R, a left rear combination lamp (not shown) and a right rear combination lamp (not shown). A drawing method of the second lighting unit 142 may be a DLP method or an LCOS method. In this case, an LED is used as a light source instead of laser.

Next, the vehicle system 102 of the vehicle 100 will be described with reference to FIG. 8. FIG. 8 shows a block diagram of the vehicle system 102. As shown in FIG. 8, the vehicle system 102 includes a vehicle control unit 103, the lighting system 104, the sensor 5, the camera 6, the radar 7, the HMI 8, the GPS 9, the wireless communication unit 10 and the storage device 11. The vehicle system 102 further includes the steering actuator 12, the steering device 13, the brake actuator 14, the brake device 15, the accelerator actuator 16 and the accelerator device 17.

The vehicle control unit 103 is configured to control traveling of the vehicle 100. The vehicle control unit 103 is formed of, for example, at least one electronic control unit (ECU). The electronic control unit includes a computer system (for example, a SoC) including one or more processors and one or more memories, and an electronic circuit including an active element such as a transistor and a passive element. The processor is, for example, a CPU, an MPU, a GPU and/or a TPU. The CPU may include a plurality of CPU cores. The GPU may include a plurality of GPU cores. The memory includes a ROM and a RAM. The ROM may store a vehicle control program. For example, the vehicle control program may include an artificial intelligence (AI) program for automated driving. The AI program is a program constructed by supervised or unsupervised machine learning (particularly, deep learning) using a multilayer neural network. The RAM may temporarily store a vehicle control program, vehicle control data and/or surrounding environment information indicating surrounding environment of the vehicle. The processor may be configured to load a program designated from various vehicle control programs stored in the ROM onto the RAM and to execute various types of processing in cooperation with the RAM. The computer system may include a non-Neumann type computer such as an ASIC or an FPGA. Further, the computer system may include a combination of a Neumann type computer and a non-Neumann type computer.

As described above, the lighting system 104 includes the first lighting unit 144, the second lighting unit 142, the first lighting control unit 147 and the second lighting control unit 145. The first lighting control unit 147 is configured to control the first lighting unit 144 (particularly, the left CSL 140L and the right CSL 140R). Particularly, the first lighting control unit 147 is configured to change a lighting state (for example, lighting color, lighting intensity, blinking cycle, lighting spot and lighting area) of the left CSL 140L and the right CSL 140R.

The first lighting control unit 147 is formed of an electronic control unit (ECU), and is electrically connected to a power supply (not shown). The electronic control unit includes a computer system (for example, a SoC) including one or more processors and one or more memories, and an analog processing circuit including an active element such as a transistor and a passive element. The processor is, for example, a CPU, an MPU, a GPU and/or a TPU. The memory includes a ROM and a RAM. The computer system may include a non-Neumann type computer such as an ASIC or an FPGA. The analog processing circuit includes a lamp driving circuit (for example, an LED driver) configured to control driving of the left CSL 140L and the right CSL 140R.

For example, the first lighting control unit 147 is electrically connected to LEDs 400 (see FIG. 9) of each of the light emitting segments 143L and 143R. For example, when one of the six light emitting segments 143L emits red light, the first lighting control unit 147 supplies an electrical signal (for example, a PWM signal) to the red LED 400*a* belonging to the one light emitting segment 143L. Then, the red LED 400*a* emits the red light according to the electrical signal supplied from the first lighting control unit 147. In this way, the red light is emitted from the light emitting segment 143L. When all the six light emitting segments 143L emit white light, the first lighting control unit 147 supplies an electrical signal to the red LED 400*a*, the green LED 400*b* and the blue LED 400*c* belonging to each light emitting segment 143L. Then, the white light is generated by combining red light emitted from the red LED 400*a*, green light emitted from the green LED 400*b* and blue light emitted from the blue LED 400*c*. In this way, the white light is emitted from all the six light emitting segments 143L. The first lighting control unit 147 can allow light of various colors to be emitted from each light emitting segment 143L by adjusting the electrical signal supplied to each LED 400.

In this manner, the first lighting control unit 147 can change a lighting state (for example, lighting color, lighting intensity and blinking cycle) of each light emitting segment 143L by individually controlling lighting of each LED 400 belonging to each light emitting segment 143L (that is, by individually supplying the electrical signal to each LED 400).

The second lighting control unit 145 is configured to control the second lighting unit 142. Particularly, the second lighting control unit 145 is configured to control the first lighting unit 144 such that the second lighting unit 142 emits a light pattern toward the object when the first lighting unit 144 visually presents a message to the outside of the vehicle 100.

The second lighting control unit 145 is configured to control driving of the second lighting unit 142, and is formed of an electronic control unit (ECU). The electronic control unit includes a computer system (for example, a SoC) including one or more processors and one or more memories, and an analog processing circuit including an active element such as a transistor and a passive element. The processor is, for example, a CPU, an MPU, a GPU and/or a TPU. The memory includes a ROM and a RAM. The computer system may include a non-Neumann type computer such as an ASIC or an FPGA. The analog processing circuit includes a laser light source control circuit configured to control driving of the laser light source of the second lighting unit 142, and a light deflection device control circuit configured to control driving of the light deflection device of the second lighting unit 142.

For example, the computer system of the second lighting control unit 145 specifies the light pattern to be emitted to the outside of the vehicle 100 based on an instruction signal transmitted from the vehicle control unit 103, and then transmits a signal indicating the specified light pattern to the laser light source control circuit and the light deflection device control circuit. The laser light source control circuit generates a control signal for controlling the driving of the laser light source based on the signal indicating the light pattern, and then transmits the generated control signal to the laser light source. On the other hand, the light deflection device control circuit generates a control signal for controlling the driving of the light deflection device based on the signal indicating the light pattern, and transmits the generated control signal to the light deflection device. In this way, the second lighting control unit 145 can control the driving of the second lighting unit 142.

In the present embodiment, the first lighting control unit 147 and the second lighting control unit 145 are provided as separate components, but the first lighting control unit 147 and the second lighting control unit 145 may be integrally configured. In this respect, the first lighting control unit 147 and the second lighting control unit 145 may be configured as a single electronic control unit. The vehicle control unit 103, the first lighting control unit 147 and the second lighting control unit 145 may be configured as a single electronic control unit.

Figure 10:
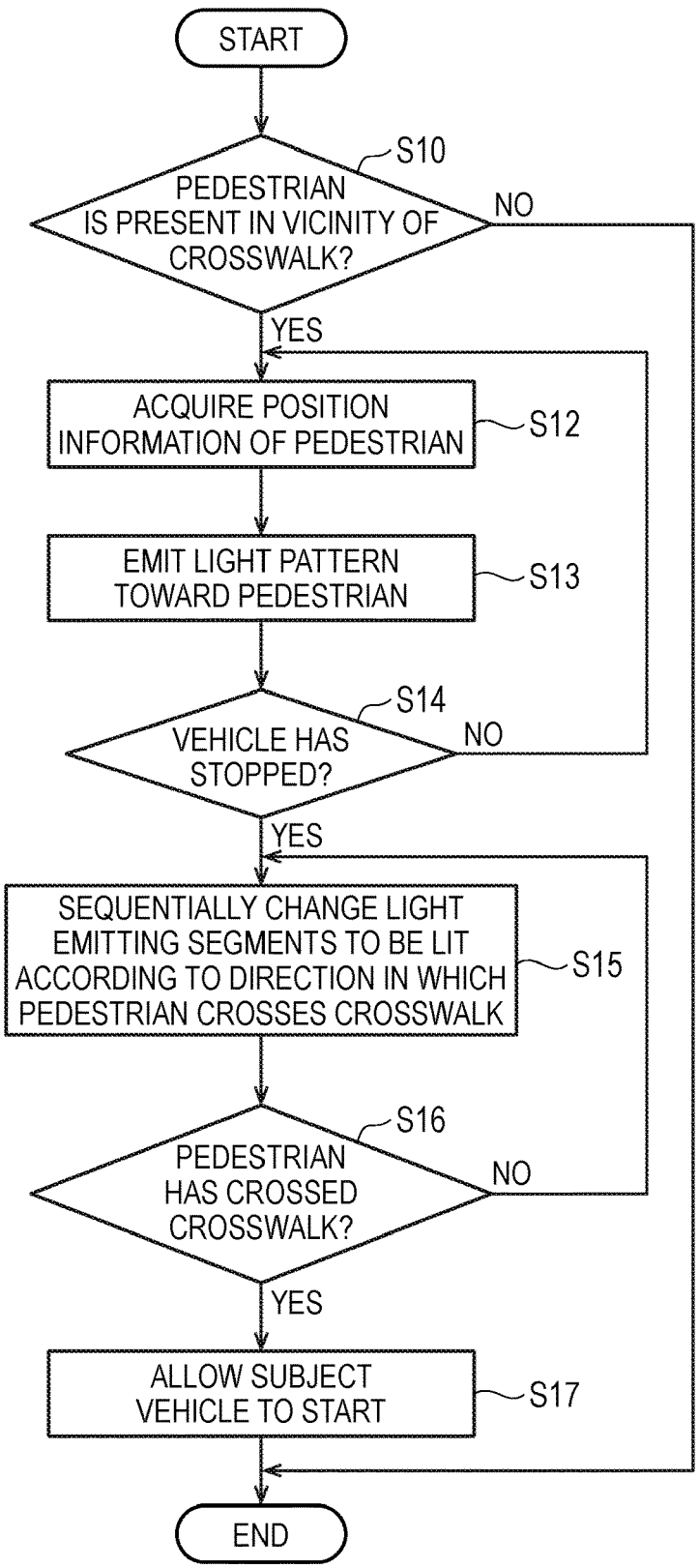
FIG. 10 is a flowchart showing an example of an operation flow of the vehicle lighting system according to the second embodiment.
Figure 11:
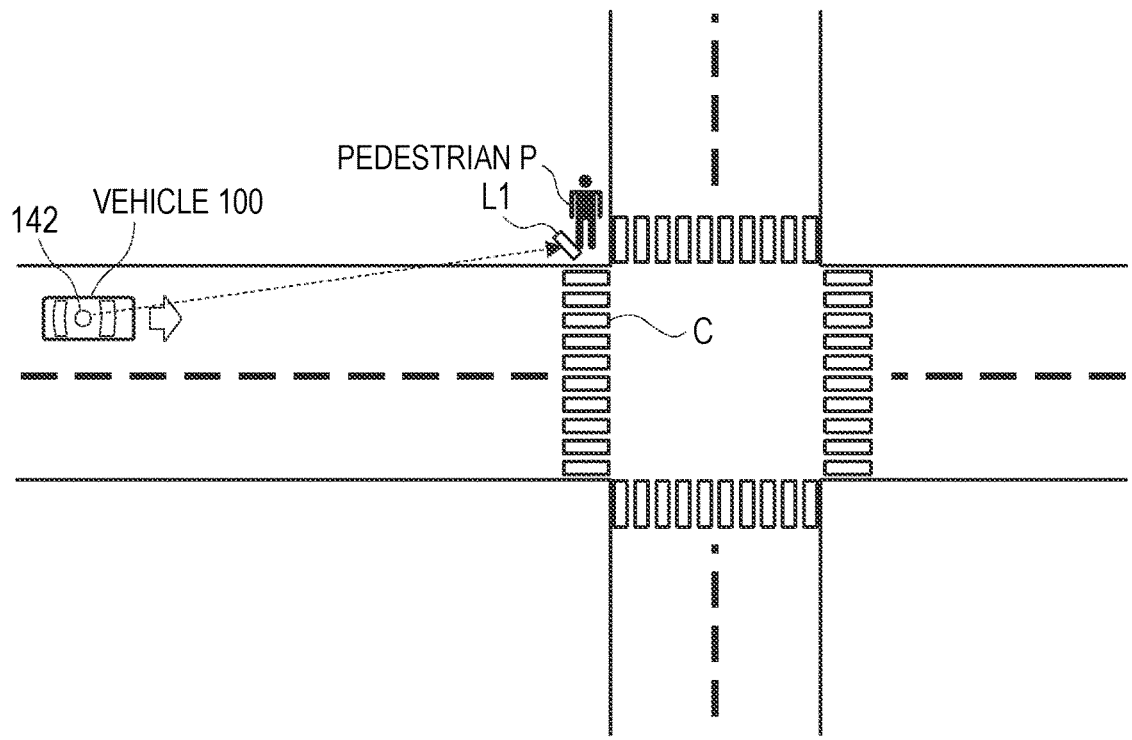
FIG. 11 is a view showing how a vehicle emits a light pattern toward a pedestrian present in vicinity of a crosswalk.
Figure 12:
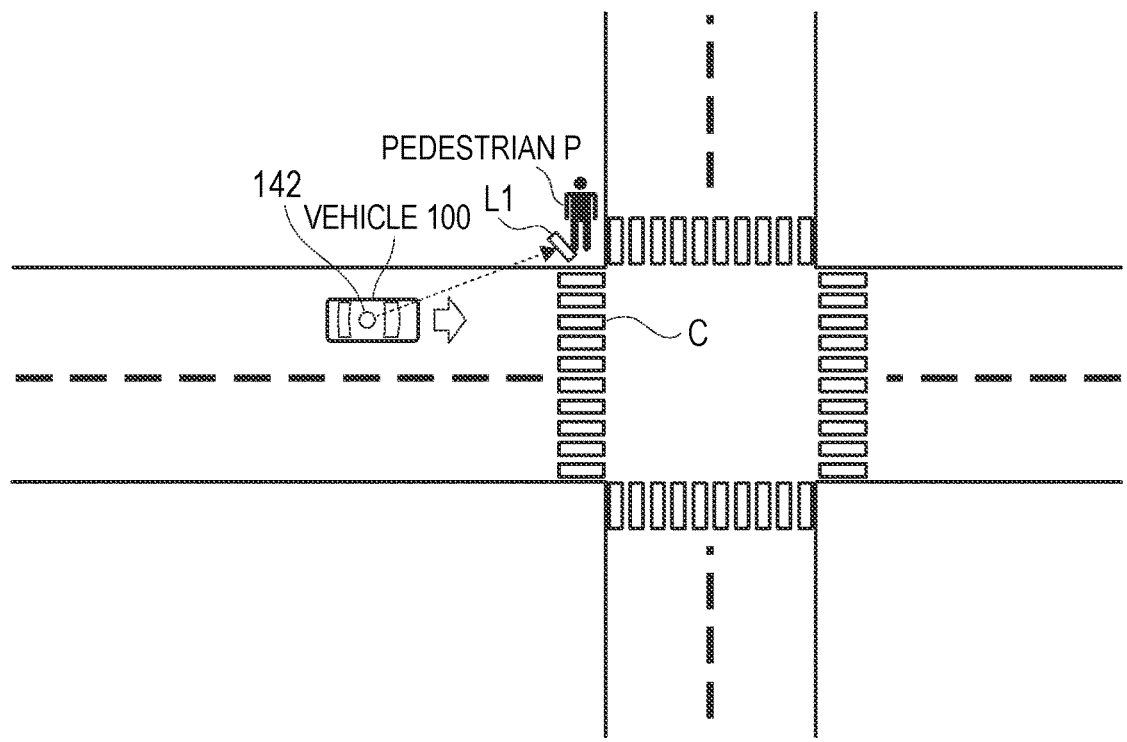
FIG. 12 is a view showing how the vehicle emits the light pattern toward the pedestrian present in vicinity of the crosswalk.
Figure 13A:
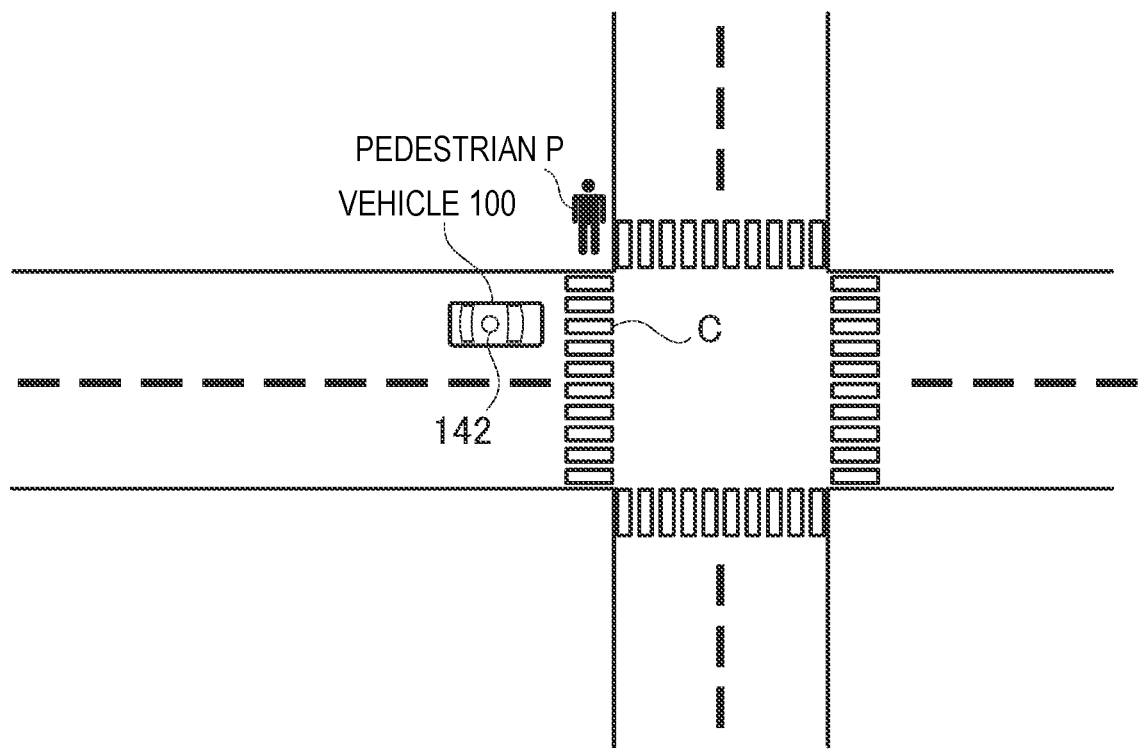
FIG. 13A is a view showing the vehicle and the pedestrian stopped before the crosswalk.
Figure 13B:
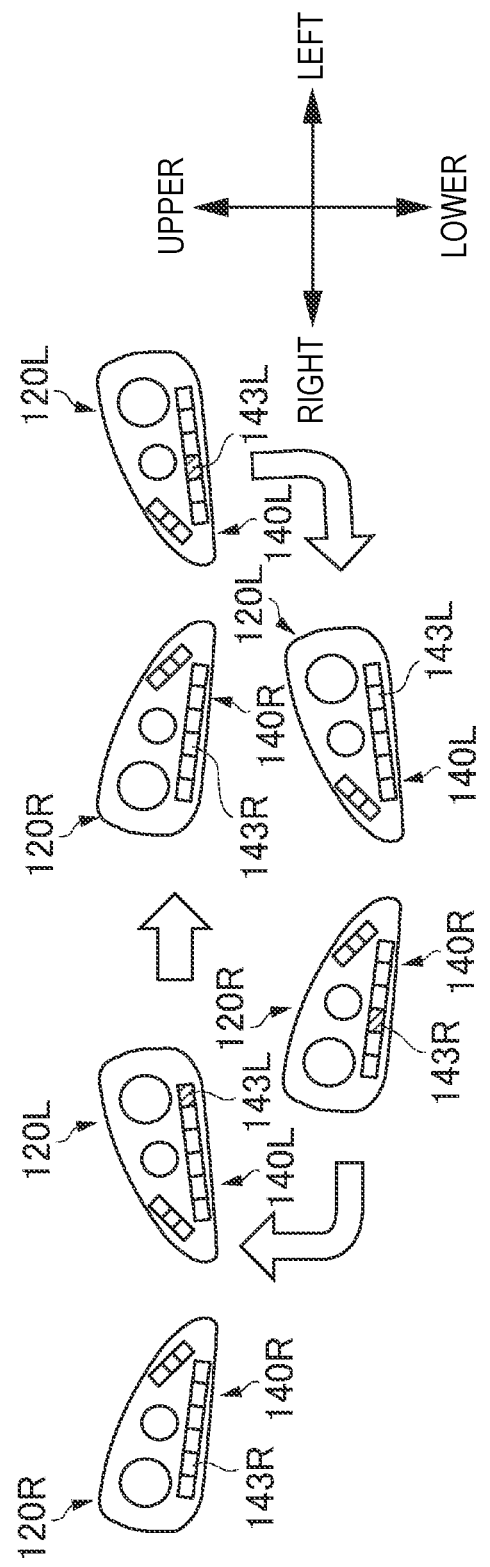
FIG. 13B is a view showing a lighting state of the left communication support lamp and the right communication support lamp in a situation shown in FIG. 13A.

Next, an example of an operation flow of the lighting system 104 will be described below with reference to FIGS. 10 to 13B. FIG. 10 is a flowchart showing the example of the operation flow of the lighting system 104 according to the present embodiment. FIG. 11 is a view showing how the vehicle 100 emits a light pattern L1 toward a pedestrian P present in vicinity of a crosswalk C when a distance D between the vehicle 100 and the pedestrian P is D1. FIG. 12 is a view showing how the vehicle 100 emits the light pattern L1 toward the pedestrian P when the distance D between the vehicle 100 and the pedestrian P is D2 (<D1). FIG. 13A is a view showing the vehicle 100 and the pedestrian P stopped before the crosswalk C. FIG. 13B is a view showing a lighting state of the left CSL 140L and the right CSL 140R in a situation shown in FIG. 13A. In the following description, only the pedestrian P is present as the object around an intersection for convenience of description.

As shown in FIGS. 10 and 11, first, the vehicle control unit 103 determines whether the pedestrian P is present in the vicinity of the crosswalk C ahead of the vehicle 100 (step S10). Particularly, the vehicle control unit 103 determines whether the pedestrian P is present in the vicinity of the crosswalk C based on detection data indicating surrounding environment of the vehicle 100 acquired by the camera 6 and/or the radar 7. When a determination result of step S10 is YES, the processing proceeds to step S12. On the other hand, when the determination result of step S10 is NO, the processing ends.

Next, in step S12, the vehicle control unit 103 acquires position information of the pedestrian P based on the detection data acquired by the camera 6 and/or the radar 7. Here, the position information of the pedestrian P is information on a relative position of the pedestrian P with respect to the vehicle 100.

Next, in step S13, the second lighting unit 142 of the lighting system 104 emits the light pattern L1 toward the pedestrian P as shown in FIG. 11. Particularly, the second lighting unit 142 draws the light pattern L1 on a road surface ahead of the pedestrian P by emitting the laser light onto the road surface ahead of the pedestrian P. In the present embodiment, the light pattern L1 is a linear light pattern, but a shape of the light pattern is not particularly limited. For example, the light pattern may be a circular light pattern.

Specifically describing the processing in step S13, first, the vehicle control unit 103 generates an instruction signal instructing emission of the light pattern L1, and then transmits the instruction signal and the position information of the pedestrian P to the second lighting control unit 145. Next, the second lighting control unit 145 controls the second lighting unit 142 such that the light pattern L1 is drawn on the road surface ahead of the pedestrian P according to the instruction signal received from the vehicle control unit 103 and the position information of the pedestrian P. Particularly, the light deflection device of the second lighting unit 142 scans the road surface ahead of the pedestrian P with the laser light emitted from the laser light source. As a result, the light pattern L1 is drawn on the road surface ahead of the pedestrian P.

The second lighting control unit 145 may determine whether the light pattern L1 is emitted onto the road surface around the pedestrian P or is directly emitted to the pedestrian P according to a state of the road surface on which the vehicle 100 is traveling. For example, when the road surface is not wet, the second lighting unit 142 may emit the light pattern L1 onto the road surface around the pedestrian P. On the other hand, when the road surface is wet, the second lighting unit 142 may directly emit the light pattern L1 to the pedestrian P (particularly, feet of the pedestrian P).

Next, in step S14, the vehicle control unit 103 determines whether the vehicle 100 has stopped before the crosswalk C based on speed information of the vehicle 100 acquired by the sensor 5. When the vehicle control unit 103 determines that the vehicle 100 has not stopped before the crosswalk C (NO in step S14), the processing returns to step S12. In this way, the processing from step S12 to step S14 are repeatedly executed until a stop of the vehicle 100 is determined. For example, as shown in FIGS. 11 and 12, the second lighting unit 142 may continue to emit the light pattern L1 onto the road surface ahead of the pedestrian P until the vehicle 100 stops before the crosswalk C. In this case, since the relative position of the pedestrian P with respect to the vehicle 100 (the position information of the pedestrian P) changes over time, the position information of the pedestrian P may be updated at a predetermined cycle, and the updated position information of the pedestrian P may be transmitted to the second lighting control unit 145 at the predetermined cycle.

Next, when the vehicle control unit 103 determines that the vehicle 100 has stopped before the crosswalk C (YES in step S14), the light emitting segments to be lit, among the six light emitting segments 143L of the left CSL 140L and the six light emitting segments 143R of the right CSL 140R, are sequentially changed along a traveling direction (step S15) according to a direction in which the pedestrian P crosses the crosswalk C (hereinafter, referred to as the traveling direction).

Specifically, the vehicle control unit 103 determines whether the pedestrian P is located on a left side or a right side of the vehicle 100, and then specifies the traveling direction of the pedestrian P. For example, as shown in FIG. 13A, when the pedestrian P is located on the left side of the vehicle 100, the vehicle control unit 103 determines that the traveling direction of the pedestrian P is the right direction as viewed from the vehicle 100. On the contrary, when the pedestrian P is located on the right side of the vehicle 100, the vehicle control unit 103 determines that the traveling direction of the pedestrian P is the left direction as viewed from the vehicle 100.

Next, the vehicle control unit 103 generates a lighting control signal instructing sequential lighting of the light emitting segments, and transmits the lighting control signal to the first lighting control unit 147. The first lighting control unit 147 sequentially changes the light emitting segments to be lit, among the six light emitting segments 143L and the six light emitting segments 143R, in the traveling direction of the pedestrian P, based on the transmitted lighting control signal.

For example, in the situation shown in FIG. 13A, the vehicle control unit 103 transmits, to the first lighting control unit 147, the lighting control signal indicating that the light emitting segments are sequentially lit in the right direction. Then, the first lighting control unit 147 sequentially changes the light emitting segments to be lit in the right direction based on the transmitted lighting control signal. In FIG. 13B, the light emitting segment 143L located on the leftmost side, the light emitting segment 143L located fourth from a left end of the left CSL 140L, and the light emitting segment 143R located fourth from a left end of the right CSL 140R are lit. However, actually, one light emitting segment may be sequentially lit between the light emitting segment 143 located on the leftmost side (hereinafter referred to as a light emitting segment 143Lm) and the light emitting segment 143R located on the rightmost side (hereinafter referred to as a light emitting segment 143Rm), or two or more light emitting segments may be sequentially lit. The sequential lighting of the light emitting segments includes not only one-by-one lighting of the light emitting segments between the light emitting segment 143 Lm and the light emitting segment 143 Rm, but also lighting of every other light emitting segment (or every two or more segments).

In this way, the first lighting unit 144 including the left CSL 140L and the right CSL 140R can visually present an guidance message urging the object to perform a predetermined action (in this embodiment, an guidance message urging the pedestrian P to cross the crosswalk C) by sequentially lighting the light emitting segments.

Next, in step S16, the vehicle control unit 103 determines whether the pedestrian P has crossed the crosswalk C based on the detection data acquired by the camera 6 and/or the radar 7. When determining that the pedestrian P has crossed the crosswalk C, the vehicle control unit 103 allows the vehicle 100 to start (step S17). Specifically, the vehicle control unit 103 transmits an accelerator control signal to the accelerator actuator 16. Next, the accelerator actuator 16 controls the accelerator device 17 based on the transmitted accelerator control signal. In this way, the vehicle 100 starts. The vehicle 100 may start before the pedestrian P has crossed the entire crosswalk C. On the other hand, when a determination result of step S16 is NO, the processing in step S15 is repeatedly executed.

When the vehicle 100 starts, the first lighting control unit 147 may change the lighting state of the left CSL 140L and the right CSL 140R in order to present a message indicating that the vehicle 100 starts to the pedestrian P. For example, the first lighting control unit 147 may blink all the light emitting segments 143L, 143R a predetermined number of times (for example, three times) in order to present the message indicating that the vehicle 100 starts to the pedestrian P.

According to the present embodiment, the lighting state of the left CSL 140L and the right CSL140R changes by sequentially lighting the light emitting segments to be lit, among the six light emitting segments 143L and the six light emitting segments 143R, along the traveling direction of the pedestrian P. In this way, the pedestrian P in the vicinity of the crosswalk C can know that the vehicle 100 recognizes the pedestrian P and can cross the crosswalk C with safe feeling by looking at a change in the lighting state of the left CSL 140L and the right CSL 140R (the guidance message guiding the pedestrian P to cross the crosswalk). As a result, the pedestrian P is guided to cross the crosswalk C by the guidance message.

According to the present embodiment, when the first lighting unit 144 visually presents the message to the outside of the vehicle 100, the second lighting unit 142 emits the light pattern L1 toward the pedestrian P. Therefore, the pedestrian P present outside the vehicle 100 can notice presence of the guidance message visually presented by the first lighting unit 144 by the light pattern L1 emitted from the second lighting unit 142 toward the pedestrian P, and can recognize that the guidance message is a message presented from the vehicle 100 to the pedestrian P. In this way, the lighting system 104 capable of realizing rich visual communication between the vehicle 100 and the object such as the pedestrian P can be provided.

Figure 14:
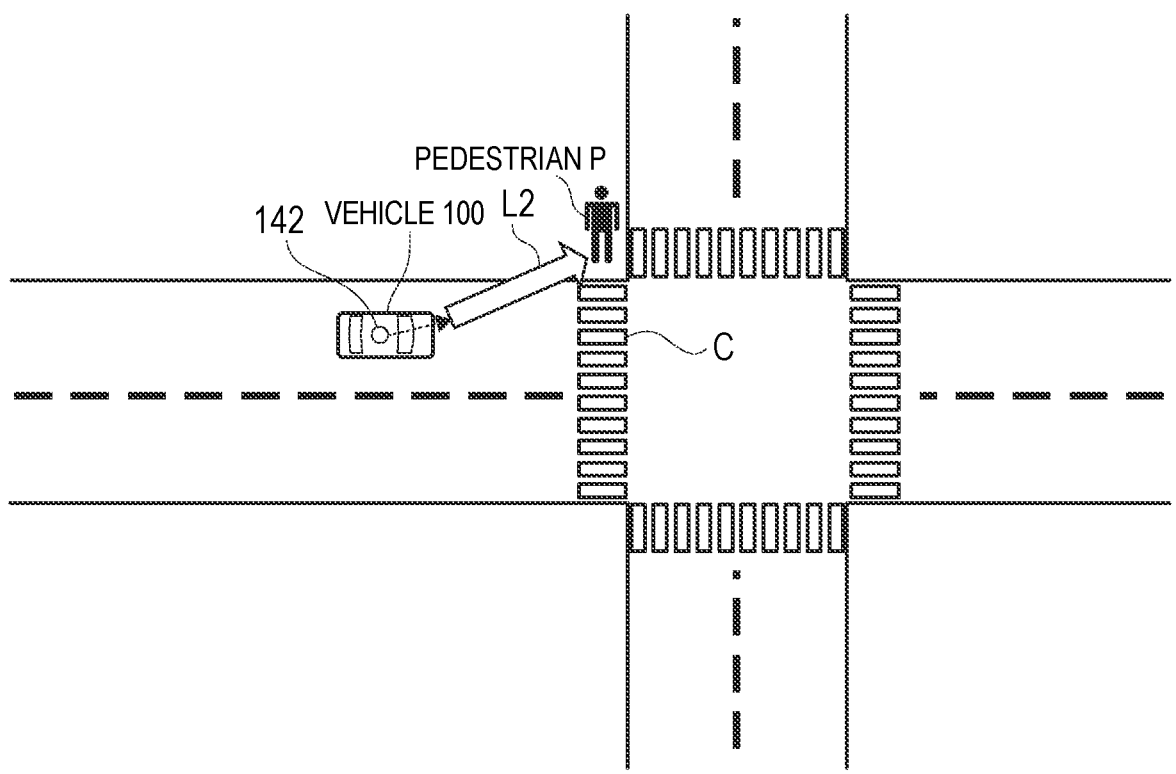
FIG. 14 is a view showing another example of the light pattern emitted from the vehicle.

As shown in FIG. 14, instead of the linear light pattern L1, the second lighting unit 142 may draw a linear light pattern L2 extending from the vehicle 100 toward the pedestrian P on the road surface. In this case, since the pedestrian P and the vehicle 100 are visually associated with each other by the light pattern L2, the pedestrian P can clearly know that the vehicle 100 recognizes the pedestrian P by looking at the light pattern L2. Therefore, the pedestrian P can easily notice the presence of the guidance message visually presented by the first lighting unit 144, and can intuitively recognize that the guidance message is the message presented from the vehicle 100 to the pedestrian P.

In the description of the present embodiment, after the vehicle 100 has stopped before the crosswalk C, the first lighting unit 144 presents the guidance message to the pedestrian P. In other words, after the second lighting unit 142 emits the light pattern toward the pedestrian P, the first lighting unit 144 presents the guidance message to the pedestrian P. However, the present embodiment is not limited to thereto. For example, before the vehicle 100 stops before the crosswalk C, the first lighting unit 144 may present the guidance message to the pedestrian P. In this respect, while the first lighting unit 144 is presenting the guidance message, the second lighting unit 142 may emit the light pattern toward the pedestrian P. Particularly, after the first lighting unit 144 starts presenting the guidance message, the second lighting unit 142 may emit the light pattern toward the pedestrian P. The same applies to this case as well, the pedestrian P present outside the vehicle 100 can notice the presence of the guidance message presented by the first lighting unit 144 by the light pattern L1 emitted from the second lighting unit 142 toward the pedestrian P, and can recognize that the guidance message is the message presented from the vehicle 100 to the pedestrian P.

Figure 15:
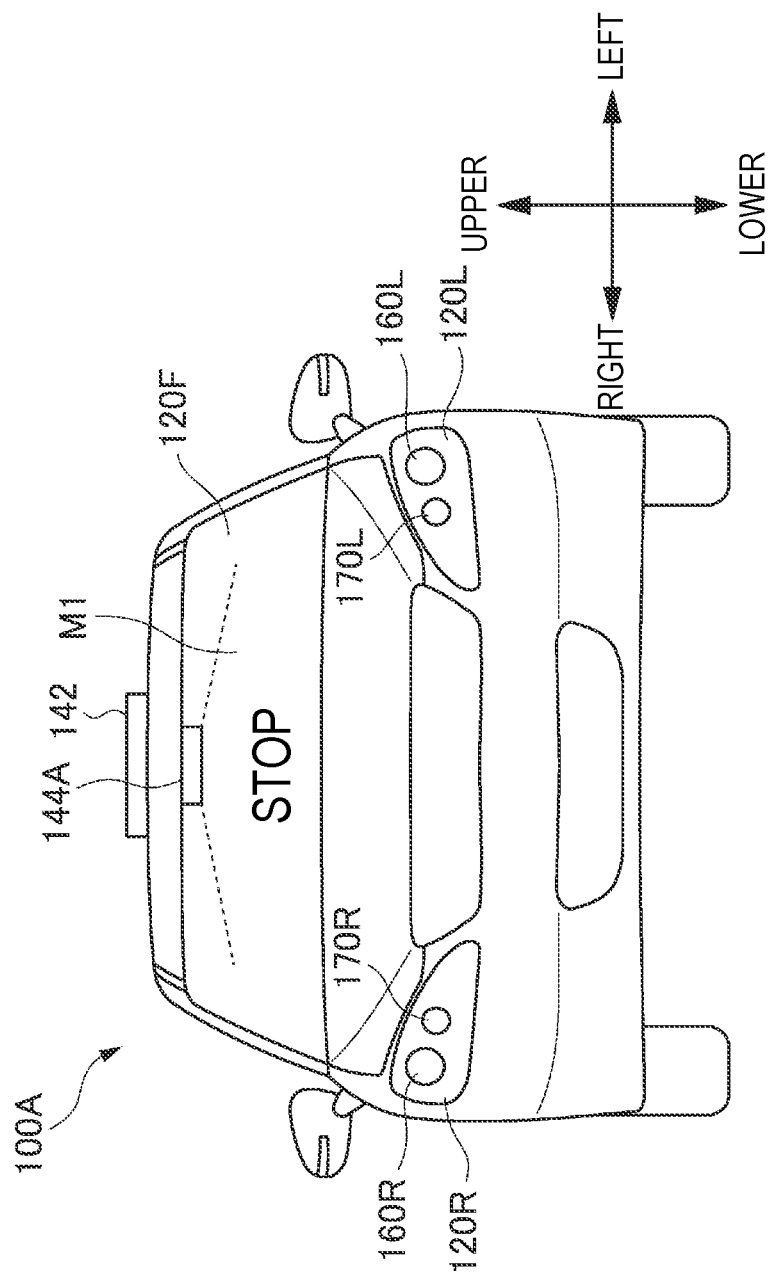
FIG. 15 is a view showing an example of a message visually presented to a pedestrian from a first lighting unit according to a modification of the second embodiment.
Figure 16:
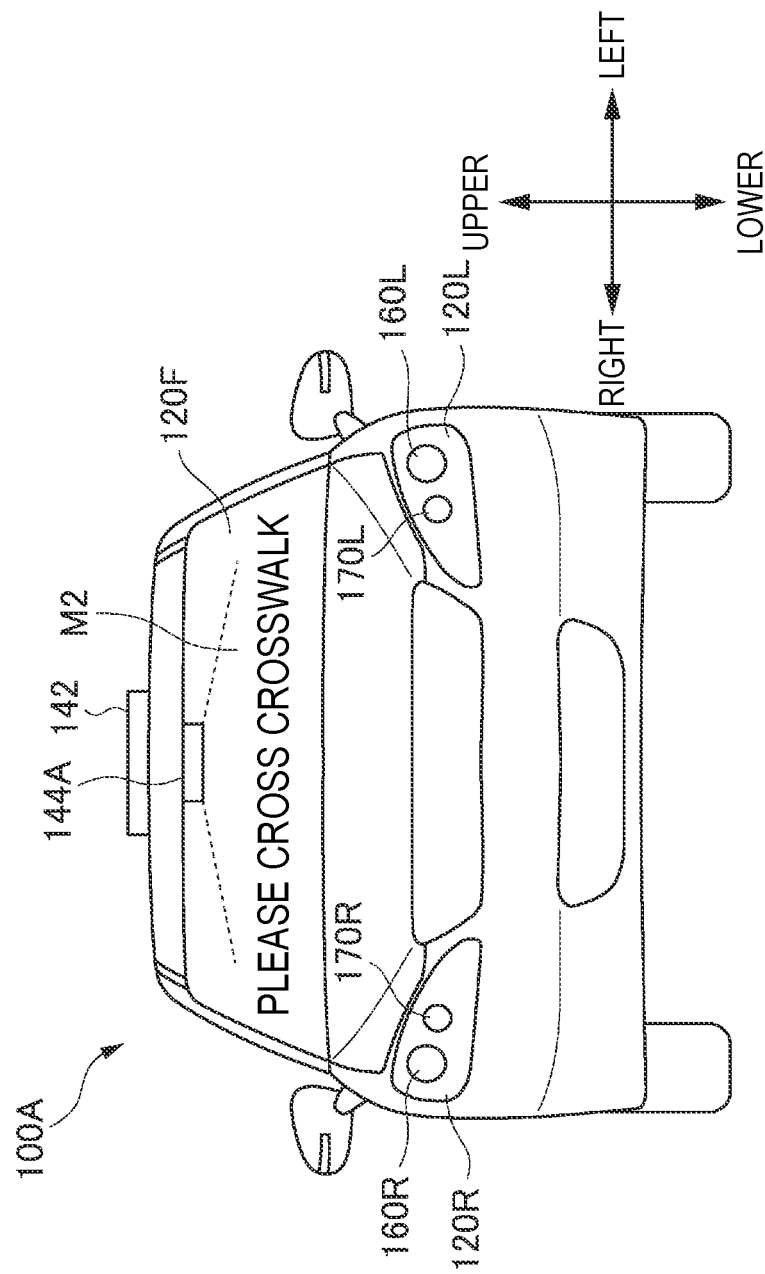
FIG. 16 is a view showing another example of a message visually presented to the pedestrian from the first lighting unit according to the modification of the second embodiment.

Next, a vehicle 100A equipped with a first lighting unit 144A according to a modification of the second embodiment will be described with reference to FIGS. 15 and 16. FIG. 15 is a view showing a stop notification message M1 (character information) visually presented to the pedestrian P from the first lighting unit 144A according to the modification of the second embodiment. FIG. 16 is a view showing a guidance message M2 (character information) visually presented to the pedestrian P from the first lighting unit 144A. The vehicle 100A is different from the vehicle 100 according to the present embodiment in that the first lighting unit 144A is mounted instead of the first lighting unit 144. Hereinafter, the first lighting unit 144A will be described in detail.

As shown in FIGS. 15 and 16, the first lighting unit 144A is configured to visually present a predetermined message to outside of the vehicle 100A. Particularly, the first lighting unit 144A is configured to display the stop notification message M1 ("Stop") or the guidance message M2 ("Please cross the crosswalk") guiding to cross the crosswalk on a windshield 120F of the vehicle 100A. In this example, messages M1, M2 are displayed on the windshield 120F as the character information, but a message may be displayed on the windshield 120F as graphic information.

The first lighting unit 144A may be configured as a projector device that projects the predetermined message onto the windshield 120F. The first lighting unit 144A may draw the predetermined message on the windshield 120F by irradiating the windshield 120F with laser light. In this case, the windshield 120F of the vehicle 100A is a windshield for a head-up display (HUD), and may include a light emitting layer formed of two glass plates and a phosphor material provided between the two glass plates. A laser light source of the first lighting unit 144A may be configured to emit the laser light in a short wavelength band (for example, a wavelength $\lambda=350$ nm to 410 nm). When the windshield 120F is irradiated with the laser light in the short wavelength band, the light emitting layer of the windshield 120F emits light and the predetermined message is displayed on the windshield 120F.

When the distance D between the vehicle 100A and the pedestrian P present in vicinity of the crosswalk C is equal to or smaller than a predetermined distance Dth, the first lighting unit 144A may present the stop notification message M1 shown in FIG. 15 to the pedestrian P. In this case, while the first lighting unit 144A is presenting the stop notification message M1, the second lighting unit 142 may emit the light pattern L1 toward the pedestrian P. Particularly, after the first lighting unit 144 starts displaying the message M1, the second lighting unit 142 may emit the light pattern L1 toward the pedestrian P. The pedestrian P can notice presence of the stop notification message M1 visually presented by the first lighting unit 144A by the light pattern L1, and can recognize that the stop notification message M1 is a message presented from the vehicle 100 to the pedestrian P. The pedestrian P can know that the vehicle 100 stops and can cross the crosswalk C with safe feeling by looking at the stop notification message M1.

The first lighting unit 144A may present the guidance message M2 shown in FIG. 16 to the pedestrian P after the vehicle 100A has stopped before the crosswalk C. In this case, the pedestrian P in the vicinity of the crosswalk C can know that the vehicle 100A recognizes the pedestrian P and can cross the crosswalk C with safe feeling by looking at the guidance message M2. As a result, the pedestrian P is guided to cross the crosswalk C.

Figure 17:
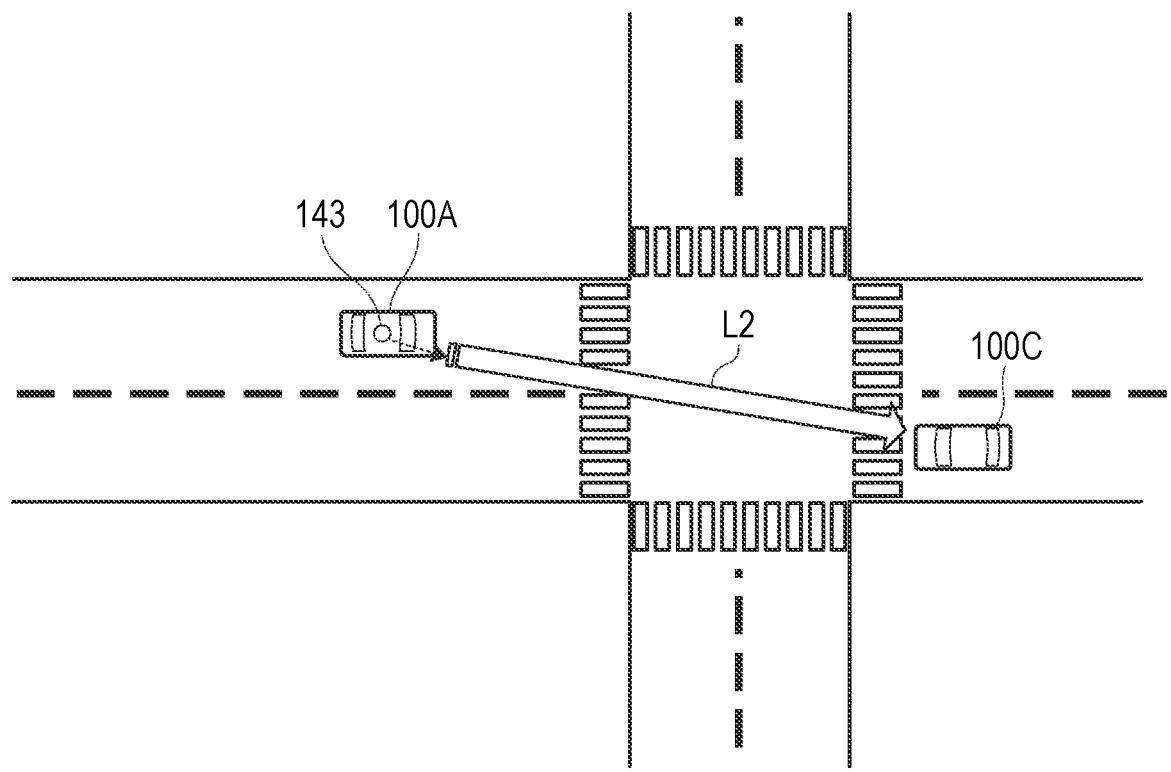
FIG. 17 is a view showing how the vehicle emits a light pattern toward the other vehicle about to turn right.

Next, a situation in which the vehicle 100A emits the light pattern L2 toward the other vehicle 100C and visually presents a guidance message M3 toward the other vehicle 100C will be described with reference to FIGS. 17 and 18. FIG. 17 is a view showing how the vehicle 100A emits the light pattern L2 toward the other vehicle 100C about to turn right. FIG. 18 is a view showing the guidance message M3 presented from the first lighting unit 144A to the other vehicle 100C.

First, the vehicle control unit 103 of the vehicle 100A detects presence of the other vehicle 100C about to turn right in vicinity of an intersection based on detection data acquired by the camera 6 and/or the radar 7. For example, when the vehicle control unit 103 specifies that a right turn signal lamp of the other vehicle 100C is blinking based on the detection data, the vehicle control unit 103 determines that the other vehicle 100C is a vehicle about to turn right. Next, the vehicle control unit 103 acquires a position information of the other vehicle 100C based on the detection data. Then, as shown in FIG. 17, the second lighting unit 142 draws the linear light pattern L2 extending from the vehicle 100A toward the other vehicle 100C on a road surface. Particularly, the second lighting control unit 145 controls the second lighting unit 142 such that the light pattern L2 is drawn from the vehicle 100A toward the other vehicle 100C based on an instruction signal received from the vehicle control unit 103 and the position information of the other vehicle 100C. Then, the first lighting control unit 147 controls the first lighting unit 144A such that the first lighting unit 144A displays the guidance message M3 ("Please turn right") shown in FIG. 18 on the windshield 120F. Here, while the second lighting unit 142 emits the light pattern L2, the first lighting unit 144A may display the guidance message M3 on the windshield 120F.

In this way, a driver of the other vehicle 100C can notice presence of the guidance message M3 presented by the first lighting unit 144A by the light pattern L2, and can intuitively recognize that the guidance message M3 is a message presented from the vehicle 100A to the driver. The driver of the other vehicle 100C can turn right at the intersection with safe feeling by looking at the guidance message M3. In this way, rich visual communication between the vehicle 100A and the other vehicle 100C can be realized.

In this example, after the second lighting unit 142 emits the light pattern L2 toward the pedestrian P, the first lighting unit 144A presents the guidance message M3 toward the other vehicle 100C. However, the present example is not limited to thereto. For example, after the first lighting unit 144A starts presenting the guidance message M3, the second lighting unit 142 may emit the light pattern L2 toward the pedestrian P.

Third Embodiment

Next, a third embodiment of the present invention will be described with reference to the drawings. Description of members having the same reference numerals as those already described in the description of the present embodiment will be omitted for convenience of description. Dimensions of members shown in the drawings may be different from those of actual members for convenience of description.

In the description of this embodiment, a "left-right direction", an "upper-lower direction" and a "front-rear direction" will be appropriately referred to for convenience of description. These directions are relative directions set for a vehicle 200 shown in FIGS. 19A and 19B. Here, the "left-right direction" is a direction including a "left direction" and a "right direction". The "upper-lower direction" is a direction including an "upper direction" and a "lower direction". The "front-rear direction" is a direction including a "front direction" and a "rear direction". Although not shown in FIGS. 19A and 19B, the front-rear direction is the direction orthogonal to the left-right direction and the upper-lower direction.

Figure 19A:
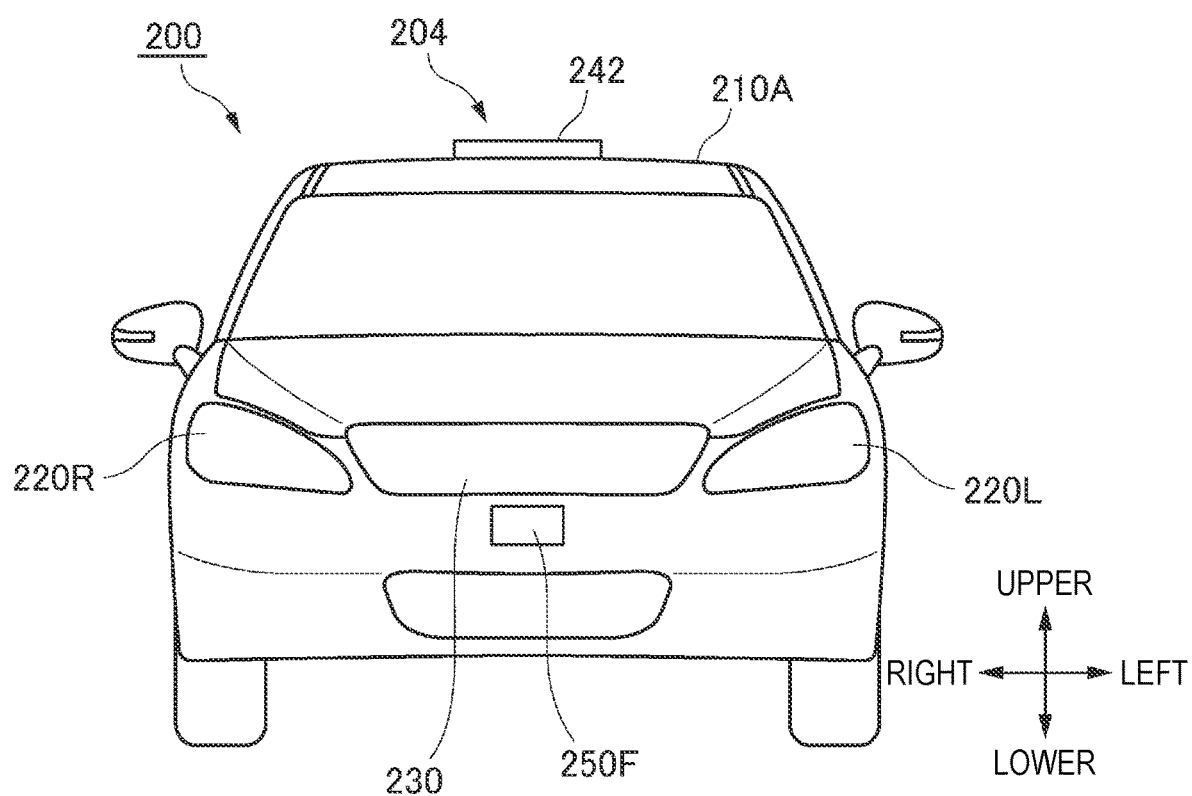
FIG. 19A is a front view of a vehicle equipped with a vehicle system according to a third embodiment of the present invention.
Figure 19B:
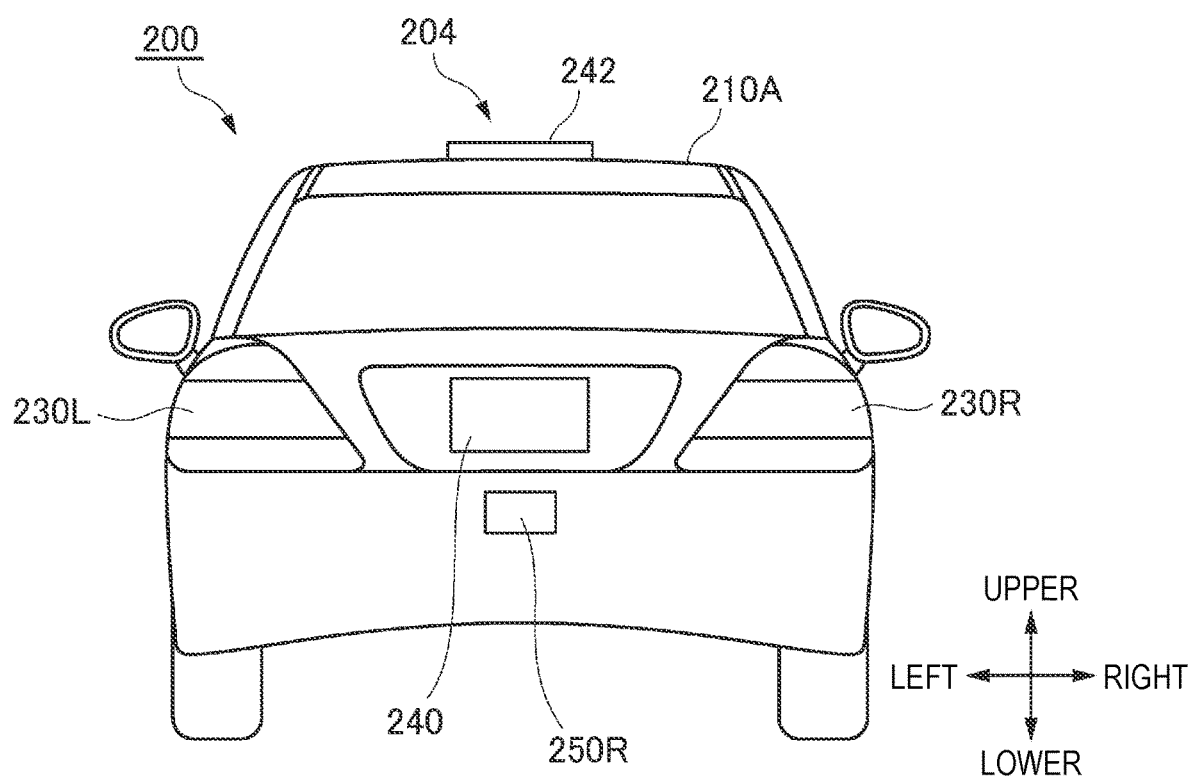
FIG. 19B is a rear view of the vehicle.
Figure 20:
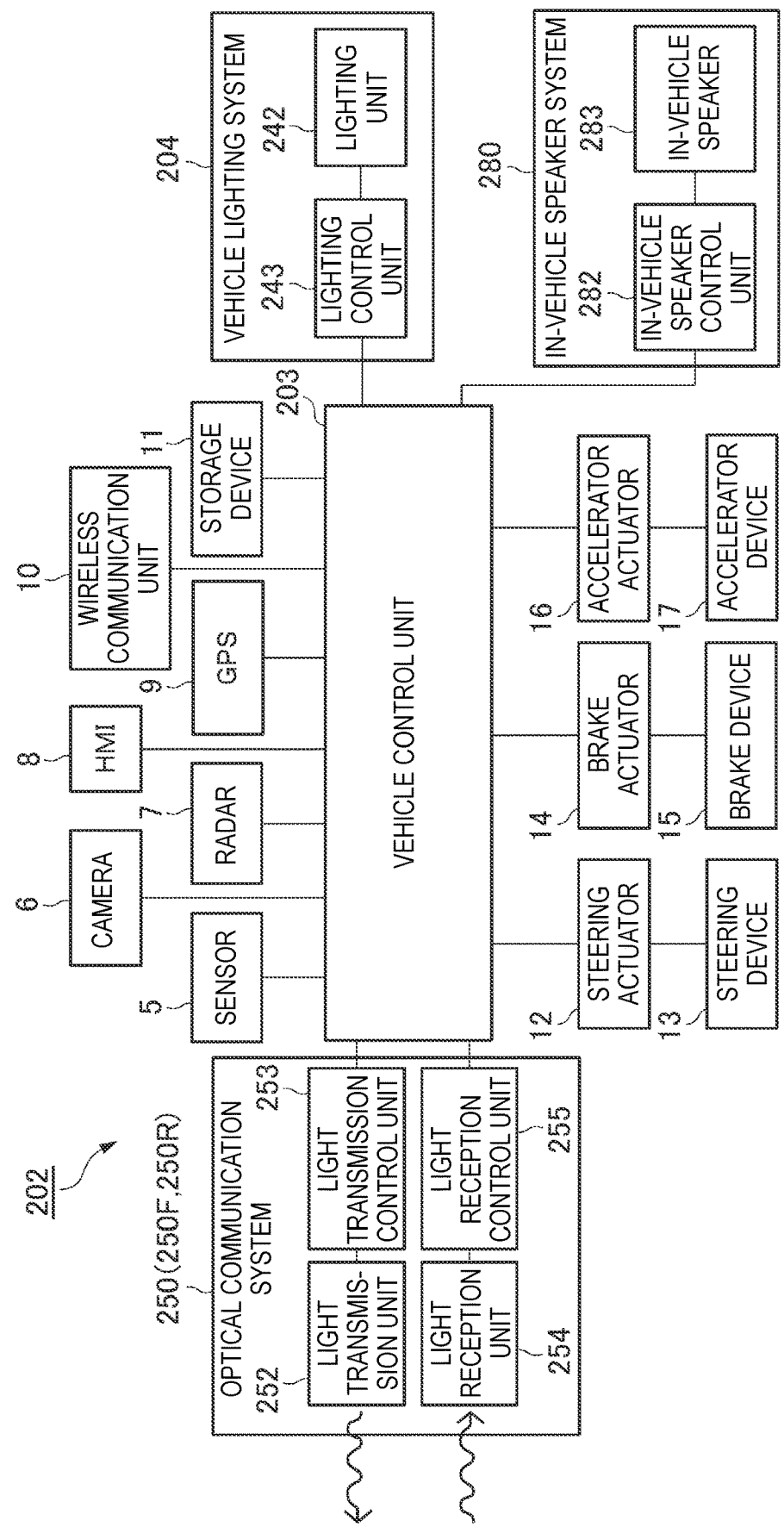
FIG. 20 is a block diagram of the vehicle system according to the third embodiment.

First, a vehicle system 202 according to the present embodiment will be described below with reference to FIGS. 19A, 19B and 20. FIG. 19A is a front view of the vehicle 200 equipped with the vehicle system 202. FIG. 19B is a rear view of the vehicle 200. FIG. 20 is a block diagram of the vehicle system 202. The vehicle 200 is a vehicle (an automobile) capable of traveling in an automated driving mode.

As shown in FIG. 20, the vehicle system 202 includes a vehicle control unit 203, a vehicle lighting system 204 (hereinafter, simply referred to as a "lighting system 204"), optical communication systems 250F, 250R, the sensor 5, the camera 6 and the radar 7. The vehicle system 202 further includes the HMI 8, the GPS 9, the wireless communication unit 10, the storage device 11 and an in-vehicle speaker system 280. The vehicle system 202 further includes the steering actuator 12, the steering device 13, the brake actuator 14, the brake device 15, the accelerator actuator 16 and the accelerator device 17.

The vehicle control unit 203 is configured to control traveling of the vehicle 200. The vehicle control unit 203 is formed of, for example, at least one electronic control unit (ECU). The electronic control unit includes a computer system (for example, a SoC) including one or more processors and one or more memories, and an electronic circuit including an active element such as a transistor and a passive element. The processor is, for example, a CPU, an MPU, a GPU and/or a TPU. The CPU may include a plurality of CPU cores. The GPU may include a plurality of GPU cores. The memory includes a ROM and a RAM. The ROM may store a vehicle control program. For example, the vehicle control program may include an artificial intelligence (AI) program for automated driving. The AI program is a program constructed by supervised or unsupervised machine learning (particularly, deep learning) using a multilayer neural network. The RAM may temporarily store a vehicle control program, vehicle control data and/or surrounding environment information indicating surrounding environment of the vehicle. The processor may be configured to load a program designated from various vehicle control programs stored in the ROM onto the RAM and to execute various types of processing in cooperation with the RAM. The computer system may include a non-Neumann type computer such as an ASIC or an FPGA. Further, the computer system may include a combination of a Neumann type computer and a non-Neumann type computer.

The lighting system 204 includes a lighting unit 242 and a lighting control unit 243. The lighting unit 242 is configured to visually present a message to outside of the vehicle 200 by drawing a light pattern on a road surface using laser light. As shown in FIGS. 19A and 19B, the lighting unit 242 is disposed on a vehicle body roof 210A of the vehicle 200, for example.

The lighting unit 242 includes, for example, a laser light source configured to emit the laser light, a light deflection device configured to deflect the laser light emitted from the laser light source, and an optical system member such as a lens. The laser light source is, for example, an RGB laser light source configured to emit red laser light, green laser light and blue laser light. The light deflection device is, for example, a MEMS mirror, a galvanometer mirror, a polygon mirror or the like. As will be described below, the lighting unit 242 is configured to draw a light pattern L10 (see FIG. 22) on the road surface by scanning with the laser light. When the laser light source is the RGB laser light source, the lighting unit 242 can draw the light pattern of various colors on a road.

Although a single lighting unit 242 is disposed on the vehicle body roof 210A in the present embodiment, the number, arrangement, shape and the like of the lighting unit 242 are not particularly limited as long as the lighting unit 242 can draw the light pattern on the road surface. For example, when two lighting units 242 are provided, one of the two lighting units 242 may be mounted in a left headlamp 220L and the other may be mounted in the right headlamp 220R. When four lighting units 242 are provided, one lighting unit 242 may be mounted in each of the left headlamp 220L, the right headlamp 220R, a left rear combination lamp 230L and a right rear combination lamp 230R. Although a raster scan method is adopted as a drawing method of the lighting unit 242 in the description of the present embodiment, the present embodiment is not limited thereto. For example, the drawing method of the lighting unit 242 may be a DLP method or an LCOS method. In this case, an LED is used as a light source instead of laser.

The lighting control unit 243 is configured to control driving of the lighting unit 242, and is formed of an electronic control unit (ECU). The electronic control unit includes a computer system (for example, an SoC) including one or more processors and one or more memories, a laser light source control circuit (an analog processing circuit) configured to control driving of the laser light source of the lighting unit 242, and an light deflection device control circuit (an analog processing circuit) configured to control driving of the light deflection device of the lighting unit 242. The processor is, for example, a CPU, an MPU, a GPU and/or a TPU. The memory includes a ROM and a RAM. The computer system may include a non-Neumann type computer such as an ASIC or an FPGA. In the present embodiment, the vehicle control unit 203 and the lighting control unit 243 are provided as separate components, but the vehicle control unit 203 and the lighting control unit 243 may be integrally configured. In this respect, the lighting control unit 243 and the vehicle control unit 203 may be formed of a single electronic control unit.

For example, the computer system of the lighting control unit 243 specifies the light pattern to be emitted to the outside of the vehicle 200 based on an instruction signal transmitted from the vehicle control unit 203, and then transmits a signal indicating the specified light pattern to the laser light source control circuit and the light deflection device control circuit. The laser light source control circuit generates a control signal for controlling the driving of the laser light source based on the signal indicating the light pattern, and then transmits the generated control signal to the laser light source of the lighting unit 242. On the other hand, the light deflection device control circuit generates a control signal for controlling the driving of the light deflection device based on the signal indicating the light pattern, and transmits the generated control signal to the light deflection device of the lighting unit 242. In this way, the lighting control unit 243 can control the driving of the lighting unit 242.

As shown in FIGS. 19A and 19B, the optical communication system 250F is disposed on a front side of the vehicle 200. The optical communication system 250F may be disposed, for example, in a bumper directly below a grille 230. The optical communication system 250R is disposed on a rear side of the vehicle 200. The optical communication system 250F may be disposed, for example, in a bumper directly below a rear license plate 240. In the following description, the optical communication systems 250F, 250R may be collectively referred to simply as an optical communication system 250.

Each of the optical communication systems 250F, 250R includes a light transmission unit 252, a light transmission control unit 253, a light reception unit 254 and a light reception control unit 255. The light transmission unit 252 is configured to emit light in a wavelength band associated with a predetermined auditory message toward a light reception unit 254 mounted other vehicles present outside the vehicle 200. The light transmission unit 252 includes a wavelength tunable light source (for example, a wavelength tunable laser) configured to emit light of various wavelengths, a light deflection device configured to deflect the light (for example, laser light) emitted from the wavelength tunable light source, and an optical system member such as a lens. The wavelength tunable light source is configured to emit visible light or invisible light, and a wavelength range of light emitted from the wavelength tunable light source is not particularly limited.

The light transmission control unit 253 is configured to control driving of the light transmission unit 252. Particularly, the light transmission control unit 253 determines the light emitted from the light transmission unit 252 from a plurality of different lights in different wavelength bands, and controls the light transmission unit 252 such that the light transmission unit 252 emits the light toward the light reception unit 254 mounted on other vehicles. For example, the light transmission control unit 253 is configured to determine the auditory message corresponding to the light pattern (a visual message) drawn by the lighting unit 242, and then to determine a wavelength band $\Delta\lambda 1$ (or a center wavelength $\lambda c1$) corresponding to the determined auditory message. The light transmission control unit 253 is configured to control the light transmission unit 252 such that the light in the determined wavelength band Δλ1 is emitted from the light transmission unit 252.

The light transmission control unit 253 is formed of an electronic control unit (ECU). The electronic control unit may include a computer system including one or more processors (for example, a CPU or an MPU) and one or more memories (for example, a ROM or a RAM), a laser light source control circuit (an analog processing circuit) configured to control driving of the wavelength tunable light source of the light transmission unit 252, and an light deflection device control circuit (an analog processing circuit) configured to control driving of the light deflection device of the light transmission unit 252. The memory may store a table (a message conversion table) indicating a relationship between the visual message presented by the lighting unit 242 and the auditory message, and a table (wavelength conversion table) indicating a relationship between the auditory message and the wavelength band of the light emitted from the light transmission unit 252. In this case, the light transmission control unit 253 may determine the auditory message corresponding to the visual message with reference to the message conversion table. The light transmission control unit 253 may determine the wavelength band of the light emitted from the light transmission unit 252 corresponding to the auditory message with reference to the wavelength conversion table, and then control the driving of the light transmission unit 252 such that the light in the determined wavelength band is emitted from the light transmission unit 252. In the present embodiment, the vehicle control unit 203 and the light transmission control unit 253 are provided as separate components, but the vehicle control unit 203 and the light transmission control unit 253 may be integrally configured.

The light reception unit 254 is configured to receive the light (for example, the laser light) emitted from the light transmission unit 252 of other vehicles. The light reception unit 254 may be configured as, for example, an optical spectroscope configured to measure an electromagnetic wave spectrum of the received light. The optical spectroscope has a dispersive element (for example, a diffraction grating or a prism) configured to disperse the received light, and a photodetector configured to convert an optical signal into an electrical signal. The light reception control unit 255 is configured to specify the wavelength band of the light emitted from the light transmission unit 252 based on a signal output from the light reception unit 254 and specify the auditory message corresponding to the wavelength band of the specified light. The light reception control unit 255 is configured to transmit the auditory message specified via the vehicle control unit 203 to the in-vehicle speaker system 280.

The light reception control unit 255 is formed of an electronic control unit (ECU). The electronic control unit may include a computer system including one or more processors (for example, a CPU or an MPU) and one or more memories (for example, a ROM and a RAM), and an analog processing circuit configured to process the electrical signal output from the light reception unit 254. The memory may store a table (a wavelength conversion table) indicating a relationship between the wavelength band of the light received by the light reception unit 254 and the auditory message. In this respect, the relationship between the wavelength band of the light and the auditory message indicated by the wavelength conversion table stored in the memory of the light reception control unit 255 preferably matches the relationship between the wavelength band of the light and the auditory message indicated by the wavelength conversion table stored in the memory of the light transmission control unit 253. For example, when the wavelength band Δλ1 and an auditory message A1 are associated with each other in the light transmission control unit 253, the wavelength band Δλ1 and the auditory message A1 are preferably associated with each other also in the light reception control unit 255. The light reception control unit 255 may specify the auditory message corresponding to the wavelength band of the light received by the light reception unit 254 with reference to the wavelength conversion table. In the present embodiment, the vehicle control unit 203 and the light reception control unit 255 are provided as separate components, but the vehicle control unit 203 and the light reception control unit 255 may be integrally configured.

The in-vehicle speaker system 280 includes an in-vehicle speaker control unit 282 and an in-vehicle speaker 283. The in-vehicle speaker 283 is configured to output sound toward an occupant of the vehicle 200, and is disposed at a predetermined position inside the vehicle 200. The in-vehicle speaker 283 is, for example, a speaker having a related-art structure. The in-vehicle speaker control unit 282 is configured to control the in-vehicle speaker 283. The in-vehicle speaker control unit 282 is formed of an electronic control unit (ECU). The electronic control unit includes a computer system including one or more processors (for example, a CPU or an MPU) and one or more memories (for example, a ROM and a RAM), and other electronic circuits (for example, an amplifier circuit and a DA converter).

Figure 21:
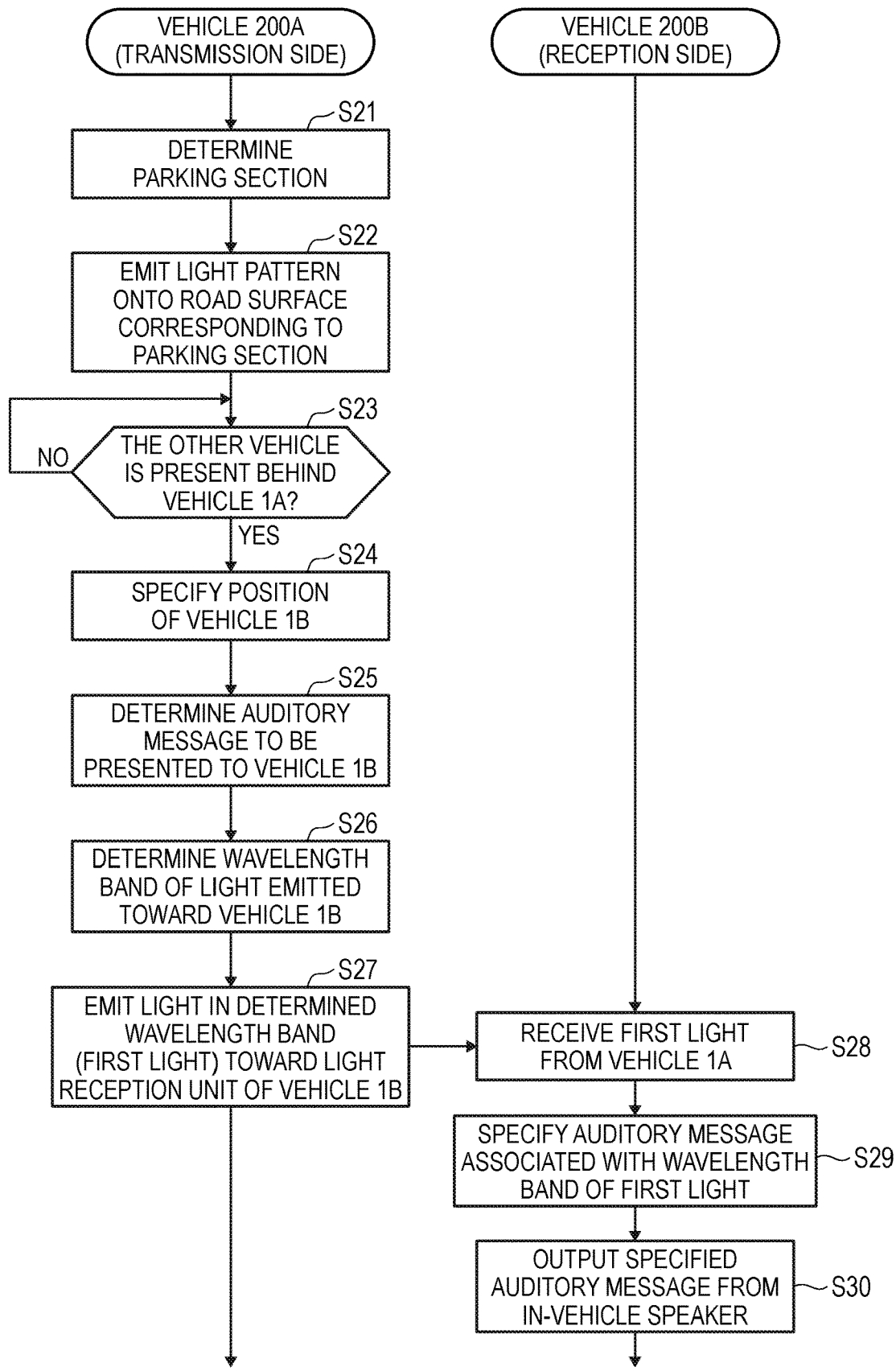
FIG. 21 is a sequence diagram showing an example of operation of an inter-vehicle communication system according to the third embodiment.
Figure 22:
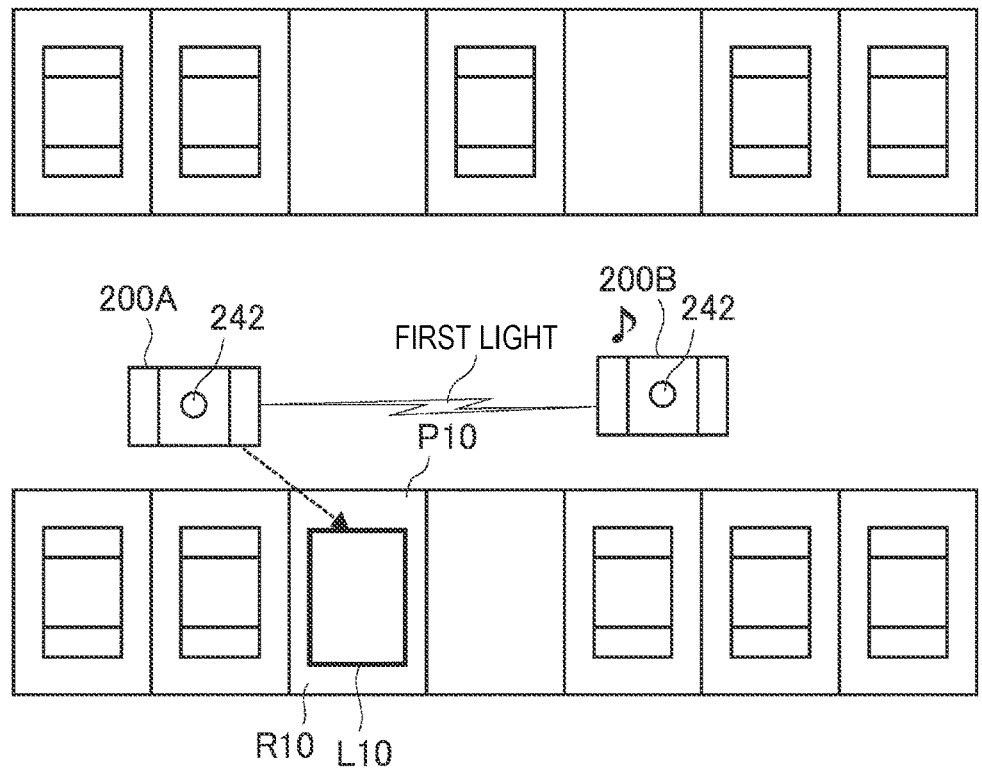
FIG. 22 is a view showing a transmission side vehicle drawing a light pattern on a road surface corresponding to a parking section, and a reception side vehicle traveling on a parking lot.

Next, an example of operation of an inter-vehicle communication system according to the present embodiment will be described below with reference to FIGS. 21 and 22. FIG. 21 is a sequence diagram showing the example of the operation of the inter-vehicle communication system according to the present embodiment. FIG. 22 is a view showing a vehicle 200A (a transmission side vehicle) drawing the light pattern L10 on a road surface R10 corresponding to a parking section P10, and a vehicle 200B (a reception side vehicle) traveling on a parking lot. The inter-vehicle communication system according to the present embodiment includes the vehicle 200A and the vehicle 200B. In the present description, vehicles 200A, 200B are present in the parking lot. The vehicles 200A, 200B are equipped with the vehicle system 202 shown in FIG. 20.

As shown in FIG. 21, in step S21, the vehicle control unit 203 of the vehicle 200A determines the parking section P10 to be parked. Specifically, the vehicle control unit 203 specifies an empty parking section around the vehicle 200A based on detection data indicating surrounding environment of the vehicle 200 acquired by the camera 6 and/or the radar 7. Then, the vehicle control unit 203 determines the parking section P10 from one or more empty parking sections.

Next, as shown in FIG. 22, the lighting unit 242 of the vehicle 200A draws the light pattern L10 on the road surface R10 corresponding to the parking section P10 by emitting laser light onto the road surface R10 corresponding to the parking section P10. In this way, a visual message can be presented to outside of the vehicle 200A by drawing the light pattern L10 on the road surface R10 by the lighting unit 242. That is, by visually recognizing the light pattern L10 (the visual message) emitted from the vehicle 200A, an occupant of the vehicle 200B can know that the vehicle 200A is scheduled to be parked in the parking section P10 and that the vehicle 200A is scheduled to move backward. Although a rectangular light pattern L10 corresponding to an external dimension of the vehicle 200A is drawn as the light pattern L10 in the present embodiment, a shape of the light pattern is not limited thereto. For example, the light pattern may be a linear or circular light pattern.

Specifically describing the processing in step S22, first, the vehicle control unit 203 generates an instruction signal instructing the light pattern L10, and then transmits the instruction signal and position information of the parking section P10 to the lighting control unit 243. Next, the lighting control unit 243 controls the lighting unit 242 such that the light pattern L10 is drawn on the road surface R10 according to the instruction signal received from the vehicle control unit 203. Particularly, the light deflection device of the lighting unit 242 scans the road surface R10 with the laser light emitted from the laser light source.

Next, the vehicle control unit 203 determines whether the other vehicle (the vehicle 200B in this example) is present behind the vehicle 200A based on the detection data acquired by the camera 6 and/or the radar 7 (step S23). When a determination result of step S23 is YES, the processing proceeds to step S24. On the other hand, when the determination result of step S23 is NO, the vehicle control unit 203 stands by until the other vehicle is present behind the vehicle 200A.

Next, in step S24, the vehicle control unit 203 specifies a position of the vehicle 200B based on the detection data acquired by the camera 6 and/or the radar 7, and then transmits position information of the vehicle 200B to the light transmission control unit 253 of the vehicle 200. Next, in step S25, the light transmission control unit 253 of the vehicle 200A determines an auditory message to be presented to the vehicle 200B. Specifically, the vehicle control unit 203 transmits message information on the light pattern L10 (the visual message) emitted from the lighting unit 242 to the light transmission control unit 253. Then, the light transmission control unit 253 determines the auditory message corresponding to the light pattern L10 with reference to the message conversion table indicating the relationship between the light pattern (the visual message) and the auditory message. An example of the auditory message corresponding to the light pattern L10 is that "the vehicle ahead will move backward" or "the vehicle ahead will be parked".

Next, in step S26, the light transmission control unit 253 determines a wavelength band of the light emitted toward the light reception unit 254 of the vehicle 200B. Specifically, the light transmission control unit 253 determines the wavelength band (a first wavelength band) of the light emitted from the light transmission unit 252 corresponding to the determined auditory message with reference to the wavelength conversion table indicating the relationship between the auditory message and the wavelength band of the light. In the wavelength conversion table, each of a plurality of auditory messages is associated with one of a plurality of wavelength bands.

Next, in step S27, the light transmission control unit 253 controls driving of the light transmission unit 252 such that the light in the determined wavelength band (hereinafter, referred to as a "first light") is emitted from the light transmission unit 252 toward the light reception unit 254 of the vehicle 200B, based on the position information of the vehicle 200B transmitted from the vehicle control unit 203. In this respect, when the light reception unit 254 is mounted on a front bumper of the vehicle 200B, the light transmission unit 252 emits the first light toward the front bumper of the vehicle 200B.

Next, in step S28, the light reception unit 254 of the vehicle 200B receives the first light from the vehicle 200A. Next, the light reception control unit 255 of the vehicle 200B specifies an auditory message associated with the wavelength band of the first light (step S29). Specifically, first, the light reception control unit 255 specifies the wavelength band of the first light based on an electrical signal output from the light reception unit 254. Next, the light reception control unit 255 specifies the auditory message corresponding to the wavelength band of the first light with reference to the wavelength conversion table indicating the relationship between the wavelength band of the first light and the auditory message. Here, when the auditory message corresponding to the light pattern L10 is that "the vehicle ahead will be parked", the auditory message specified in step S29 is also that "the front vehicle will be parked".

Next, the in-vehicle speaker control unit 282 of the vehicle 200B outputs the specified auditory message from the in-vehicle speaker 283 (step S30). Specifically, the light reception control unit 255 transmits information (sound data) on the auditory message to the in-vehicle speaker control unit 282 via the vehicle control unit 203. Then, the in-vehicle speaker control unit 282 allows the in-vehicle speaker 283 to output the auditory message as audio information. In this way, the occupant of the vehicle 200B can aurally recognize the auditory message presented by the vehicle 200A through the in-vehicle speaker 283.

According to the present embodiment, when the lighting unit 242 of the vehicle 200A presents the light pattern L10 toward the outside of the vehicle 200A, the first light is emitted toward the light reception unit 254 mounted on the vehicle 200B. When the light reception unit 254 receives the first light, the auditory message associated with the wavelength band of the first light is output from the in-vehicle speaker 283 of the vehicle 200B toward the occupant of the vehicle 200B. Therefore, the occupant of the vehicle 200B can visually recognize the light pattern L10 from the vehicle 200A, and can aurally recognize the auditory message from the vehicle 200A. That is, the occupant of the vehicle 200B can visually and aurally recognize an intention of the vehicle 200A. Therefore, the inter-vehicle communication system and the vehicle system 202 capable of realizing rich communication between vehicles through visual and auditory sense can be provided.

In the present embodiment, when the lighting unit 242 presents the light pattern L10 to the outside of the vehicle 200A, the light transmission unit 252 of the vehicle 200A emits the first light toward the light reception unit 254 of the vehicle 200B. In this respect, preferably, the light transmission unit 252 of the vehicle 200A emits the first light toward the light reception unit 254 of the vehicle 200B while the lighting unit 242 is presenting the light pattern L10 toward the outside of the vehicle 200A. On the other hand, before the lighting unit 242 presents the light pattern L10 toward the outside of the vehicle 200A, the light transmission unit 252 of the vehicle 200A may emit the first light toward the light reception unit 254 of the vehicle 200B.

(First Modification)

Figure 23:
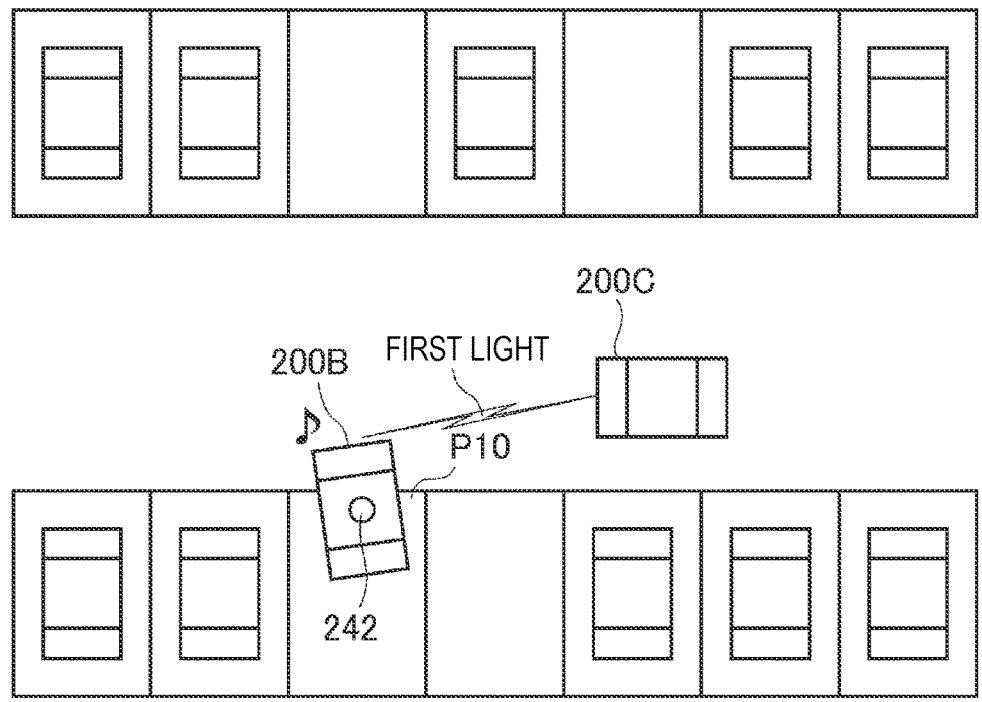
FIG. 23 is a view showing a transmission side vehicle and the reception side vehicle about to leave the parking section.
Figure 24:
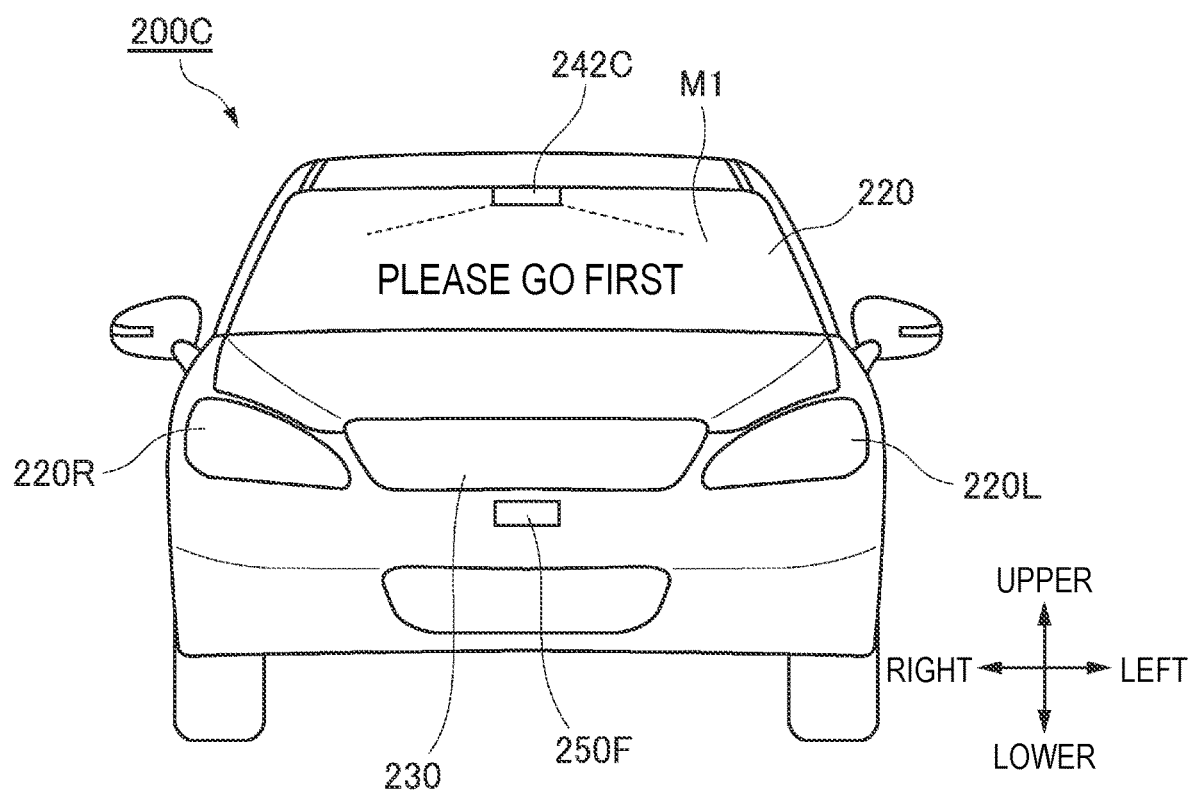
FIG. 24 is a front view of a vehicle equipped with a lighting unit according to a first modification of the third embodiment.

Next, a vehicle 200C equipped with a lighting unit 242C according to a first modification of the third embodiment will be described below with reference to FIGS. 23 and 24. FIG. 23 is a view showing the vehicle 200C (a transmission side vehicle) and the vehicle 200B (the reception side vehicle) about to leave the parking section P10. FIG. 24 is a front view of the vehicle 200C equipped with the lighting unit 242C according to the first modification of the third embodiment. The vehicle 200C is different from the vehicle 200A according to the present embodiment in that the lighting unit 242C is mounted instead of the lighting unit 242A (see FIGS. 19A and 19B). Hereinafter, the lighting unit 242C will be described in detail.

As shown in FIGS. 23 and 24, when the vehicle 200B present ahead of the vehicle 200C is about to leave the parking section P10, the lighting unit 242C of the vehicle 200C is configured to present a message M1 ("Please go first") toward outside of the vehicle 200C. Particularly, the lighting unit 242C is configured to display the message M1 on a windshield 220 of the vehicle 200C. In this example, the message M1 as character information is displayed on the windshield 220, but a message as graphic information may be displayed on the windshield 220.

The lighting unit 242C may be configured as a projector device that projects a predetermined message onto the windshield. The lighting unit 242C may draw the predetermined message on the windshield 220 by irradiating the windshield 220 with laser light. In this case, the windshield 220 of the vehicle 200C is a windshield for a HUD, and may include a light emitting layer formed of two glass plates and a phosphor material provided between the two glass plates. A laser light source of the lighting unit 242C may be configured to emit the laser light in a short wavelength band (for example, a wavelength $\lambda$=350 nm to 410 nm). When the windshield 220 is irradiated with the laser light in the short wavelength band, the light emitting layer of the windshield 220 emits light and the predetermined message is displayed on the windshield 220.

By visually recognizing the message M1 presented by the lighting unit 242C mounted on the vehicle 200C that is a rear vehicle, the occupant of the vehicle 200B about to leave the parking section P10 can know that the vehicle 200C gives way to the vehicle 200B. Then, the first light emitted from the light transmission unit 252 of the vehicle 200C is emitted toward the light reception unit 254 mounted on the vehicle 200B. Next, when the light reception unit 254 of the vehicle 200B receives the first light, the auditory message (for example, "Please go first") associated with the wavelength band of the first light is output from the in-vehicle speaker 283 of the vehicle 200B toward the occupant of the vehicle 200B. Therefore, the occupant of the vehicle 200B can visually recognize the message M1 from the vehicle 200C, and can aurally recognize the auditory message from the vehicle 200C. That is, the occupant of the vehicle 200B can visually and aurally recognize an intention of the vehicle 200C. Therefore, the inter-vehicle communication system and the vehicle system 202 capable of realizing rich communication between vehicles through visual and auditory sense can be provided.

(Second Modification)

Figure 25:
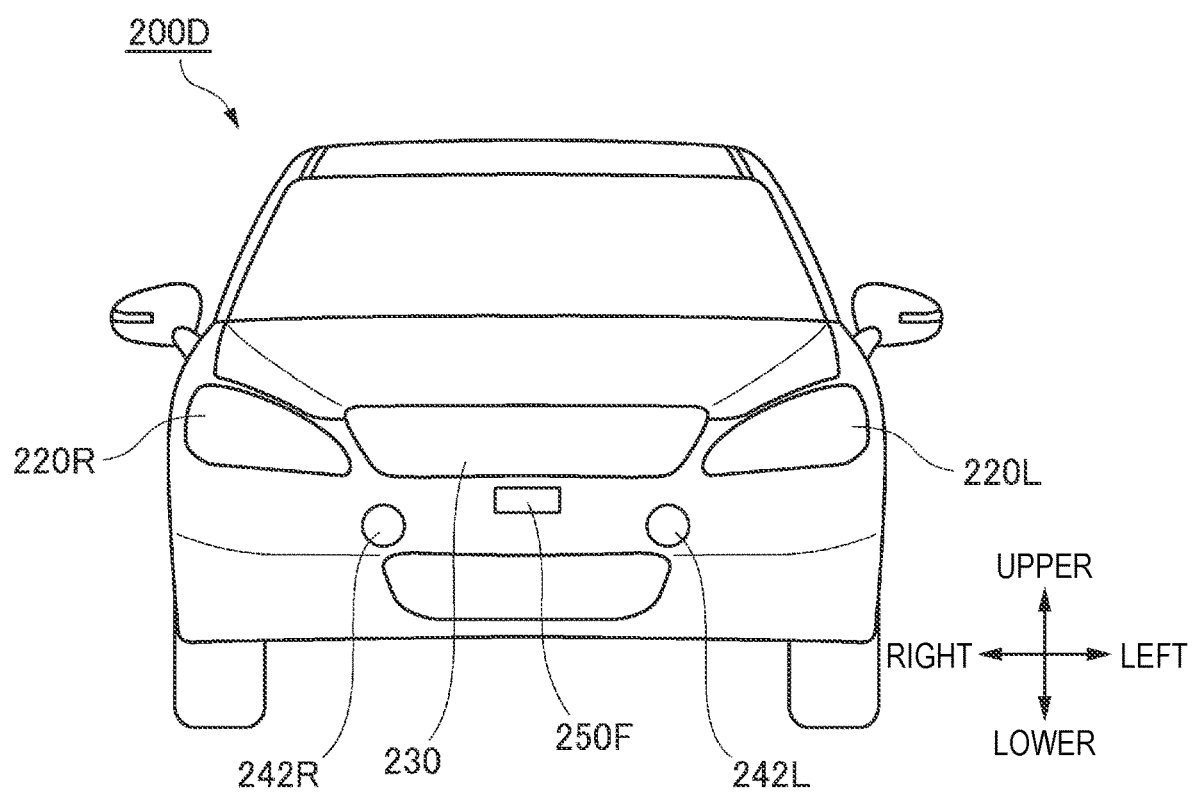
FIG. 25 is a front view of a vehicle equipped with a lighting unit according to a second modification of the third embodiment.

Next, a vehicle 200D equipped with lighting units 242L, 242R according to a second modification of the third embodiment will be described below with reference to FIG. 25. FIG. 25 is a front view of the vehicle 200D equipped with the lighting units 242L, 242R according to the second modification. The vehicle 200D is different from the vehicle 200A according to the present embodiment in that the lighting units 242L, 242R are mounted instead of the lighting unit 242A (see FIGS. 19A and 19B). Hereinafter, the lighting units 242L, 242R will be described in detail.

Each of the lighting units 242L, 242R includes one or more light emitting elements such as an LED and an LD, and an optical system member such as a lens. The lighting units 242L, 242R are configured to present a visual message toward outside of the vehicle 200D by changing lighting features of the lighting units 242L, 242R (lighting/turning off, blinking, lighting color and the like). For example, when the vehicle 200D gives way to the vehicle 200B, the lighting units 242L, 242R may blink. In this case, by visually recognizing blinking of the lighting units 242L, 242R mounted on the vehicle 200D that is a rear vehicle, the occupant of the vehicle 200B about to leave the parking section P10 can know that the vehicle 200D gives way to the vehicle 200B.

Then, the first light emitted from the light transmission unit 252 of the vehicle 200D is emitted toward the light reception unit 254 mounted on the vehicle 200B. Next, when the light reception unit 254 of the vehicle 200B receives the first light, the auditory message (for example, "Please go first") associated with the wavelength band of the first light is output from the in-vehicle speaker 283 of the vehicle 200B toward the occupant of the vehicle 200B. Therefore, the occupant of the vehicle 200B can visually recognize a change in the lighting features of the lighting units 242L, 242R of the vehicle 200D, and can aurally recognize the auditory message from the vehicle 200D. That is, the occupant of the vehicle 200B can visually and aurally recognize an intention of the vehicle 200D. Therefore, the inter-vehicle communication system and the vehicle system 202 capable of realizing rich communication between vehicles through visual and auditory sense can be provided.

Although the embodiments of the present invention have been described, it is needless to say that the technical scope of the present invention should not be interpreted in a limited manner by the description of the embodiments. It is to be understood by those skilled in the art that the present embodiments are merely examples and that various modifications can be made within the scope of the invention described in the claims. The technical scope of the present invention should be determined based on the scope of the invention described in the claims and an equivalent scope thereof.

In the present embodiments, a driving mode of the vehicle is described as including the fully automated driving mode, the advanced driving support mode, the driving support mode and the manual driving mode, but the driving mode of the vehicle should not be limited to these four modes. Classification of the driving mode of the vehicle may be appropriately changed according to laws or regulations related to automated driving in each country. Similarly, definitions of the "fully automated driving mode", the "advanced driving support mode" and the "driving support mode" in the description of the present embodiments are merely examples and may be appropriately changed according to the laws or regulations related to the automated driving in each country.

In the present embodiments, since the vehicle passes on a left side, the road width in the right lateral region of the vehicle 1 is specified in step S3, but when the vehicle passes on a right side, a road width in a left lateral region of the vehicle 1 is specified.

The present application is appropriately incorporates the contents disclosed in Japanese Patent Application (Japanese Patent Application No. 2017-254315) filed on Dec. 28, 2017, the contents disclosed in Japanese Patent Application (Japanese Patent Application No. 2017-254313) filed on Dec. 28, 2017, and the contents disclosed in Japanese Patent Application (Japanese Patent Application No. 2018-003693) filed on Jan. 12, 2018.

The invention claimed is:

1. A vehicle lighting system provided in a vehicle, comprising:
 a light source configured to emit light toward outside of a subject vehicle; and an electronic control unit configured to control the light source such that the light source visually presents, to an oncoming vehicle present ahead of the subject vehicle, predetermined information on traveling support of the oncoming vehicle, based on a vehicle width of the oncoming vehicle and a road width in a lateral region of the subject vehicle, wherein, when at least the vehicle width of the oncoming vehicle is equal to or greater than the road width in a lateral region of the subject vehicle, the electronic control unit is configured to control the light source such that the light source visually present, to the oncoming vehicle, information urging the oncoming vehicle to stop.

2. The vehicle lighting system according to claim 1, wherein the predetermined information includes at least one of character information and graphic information.

3. The vehicle lighting system according to claim 1, wherein the predetermined information includes the character information, and wherein the electronic control unit is configured to
determine a display language of the predetermined information based on a current position of the subject vehicle, and
control the light source such that the light source visually presents the predetermined information to the oncoming vehicle in the determined display language.

4. The vehicle lighting system according to claim 1, wherein the predetermined information includes the character information, and wherein the light source is configured to visually present the predetermined information to the oncoming vehicle in a plurality of display languages.

5. The vehicle lighting system according to claim 1, wherein the light source is configured to visually present the predetermined information on a road surface ahead of the oncoming vehicle.

6. The vehicle lighting system according to claim 1, wherein the unit electronic control unit is configured to wirelessly transmit the predetermined information to the oncoming vehicle.

7. A vehicle comprising:
the vehicle lighting system according to claim 1.

8. A vehicle lighting system provided in a vehicle, comprising:
a first light source configured to visually present a message to outside of a vehicle;
a first electronic control unit configured to control the first light source;
a second source configured to emit a light pattern toward an object present outside the vehicle; and
a second electronic control unit configured to control the second light source,
wherein the second electronic control unit is configured to control the second light source such that the second light source emits the light pattern toward the object when the first light source visually presents the message to the outside of the vehicle,
wherein the message is a message urging the object to perform a predetermined action, and
wherein the object is a pedestrian or an oncoming vehicle.

9. The vehicle lighting system according to claim 8, wherein the second light source is configured to draw the light pattern on a road surface around the object, and
wherein the second electronic control unit is configured to control the second light source such that the second light source draws the light pattern on the road surface around the object when the first light source visually presents the message to the outside of the vehicle.

10. The vehicle lighting system according to claim 9, wherein the light pattern is a light pattern that visually associates the object with the vehicle.

11. The vehicle lighting system according to claim 8, wherein the message is a message related to an action of the vehicle.

12. A vehicle system provided in a vehicle, comprising:
a light source configured to visually present a first message to outside of a vehicle;
a first electronic control unit configured to control the light source;
a wavelength tunable light source configured to emit a first light in a first wavelength band associated with a predetermined auditory message toward an optical spectroscope mounted on another vehicle present outside the vehicle; and
a second electronic control unit configured to control the wavelength tunable light source,
wherein the second electronic control unit is configured to control the wavelength tunable light source such that the wavelength tunable light source emits the first light toward the optical spectroscope when the lighting unit visually presents the first message to the outside of the vehicle.

13. The vehicle system according to claim 12, wherein the light source is configured to visually present the first message to the outside of the vehicle by drawing a light pattern on a road surface.

14. The vehicle system according to claim 12, wherein the light source is configured to display the first message on a windshield of the vehicle.

15. The vehicle system according to claim 12, wherein the light source is configured to visually present the first message to the outside of the vehicle by changing a lighting feature of the light source.

16. The vehicle system according to claim 12, wherein the second electronic control unit is configured to determine the first light from a plurality of different lights in different wavelength bands based on the first message, and
control the wavelength tunable light source such that the first light is emitted toward the optical spectroscope.

17. A vehicle comprising:
the vehicle system according to claim 12.

18. An inter-vehicle communication system comprising:
a first vehicle; and
a second vehicle,
wherein the first vehicle includes:
a light source configured to visually present a first message toward outside of the first vehicle;
a first electronic control unit configured to control the lighting unit;
a wavelength tunable light source configured to emit a first light in a first wavelength band toward the second vehicle; and
a second electronic control unit configured to control the wavelength tunable light source,
wherein the second vehicle includes:
an optical spectroscope configured to receive the first light;
a third electronic control unit configured to specify a predetermined auditory message associated with the first wavelength band from among a plurality of auditory messages; and an in-vehicle speaker configured to output the specified predetermined auditory message to an occupant of the second vehicle, and wherein the second electronic control unit is configured to control the wavelength tunable light source such that the wavelength tunable light source emits the first light toward the optical spectroscope when the light source visually presents the first message to the outside of the first vehicle.

* * * * *